(12) United States Patent
Mendiratta et al.

(10) Patent No.: US 9,159,077 B2
(45) Date of Patent: Oct. 13, 2015

(54) METHOD AND APPARATUS FOR DERIVING COMPOSITE TIE METRIC FOR EDGE BETWEEN NODES OF A TELECOMMUNICATION CALL GRAPH

(75) Inventors: Veena B. Mendiratta, Oak Brook, IL (US); Derek Doran, Stratford, CT (US); Chitra Phadke, Basking Ridge, NJ (US); Huseyin Uzunalioglu, Millington, NJ (US); Dan Kushnir, Springfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 530 days.

(21) Appl. No.: 13/557,815

(22) Filed: Jul. 25, 2012

(65) Prior Publication Data
US 2013/0066933 A1    Mar. 14, 2013

Related U.S. Application Data

(60) Provisional application No. 61/532,151, filed on Sep. 8, 2011.

(51) Int. Cl.
*G06Q 30/02* (2012.01)
*G06F 7/14* (2006.01)
*G06F 7/32* (2006.01)

(52) U.S. Cl.
CPC .............. *G06Q 30/0201* (2013.01); *G06F 7/14* (2013.01); *G06F 7/32* (2013.01); *G06Q 30/0202* (2013.01)

(58) Field of Classification Search
CPC ......... G06F 7/14; G06F 7/32; G06Q 30/0201; G06Q 30/0202
USPC ....................................................... 708/200
See application file for complete search history.

(56) References Cited

U.S. PATENT DOCUMENTS

2006/0165012 A1    7/2006  Habetha
2010/0146118 A1    6/2010  Wie
(Continued)

FOREIGN PATENT DOCUMENTS

JP    2005522096 A    7/2005
JP    2008178072 A    7/2008
(Continued)

OTHER PUBLICATIONS

PCT Pat. App. No. PCT/US2012/053946, International Search Report, Mailed Mar. 12, 2013, 4 Pages.
(Continued)

*Primary Examiner* — Chuong D Ngo
(74) *Attorney, Agent, or Firm* — Fay Sharpe LLP

(57) ABSTRACT

A method for deriving a composite tie metric for an edge between nodes of a telecommunication call graph includes receiving descriptive data with original values for descriptive attributes associated with a telecommunication call graph formed by edges between nodes. Each edge relates to two nodes. Each original value relates to an edge and a descriptive attribute forming an edge-attribute pair for the corresponding original value. The descriptive data is stored in a local storage device. Scaling factors for each descriptive attribute are determined taking into account a distribution of the original values for the corresponding descriptive attribute and a common base for the descriptive attributes. Weighting factors are determined for each descriptive attribute. The composite tie metric is computed for an edge based on the original value, scaling factor, and weighting factor for the descriptive attributes.

25 Claims, 12 Drawing Sheets

(56) References Cited

U.S. PATENT DOCUMENTS

| | | | |
|---|---|---|---|
| 2010/0251210 A1* | 9/2010 | Amaral et al. | 717/105 |
| 2010/0332270 A1 | 12/2010 | Richter et al. | |
| 2012/0215791 A1* | 8/2012 | Malik et al. | 707/749 |

FOREIGN PATENT DOCUMENTS

| | | |
|---|---|---|
| JP | 2010165166 A | 7/2010 |
| JP | 2010211287 A | 9/2010 |
| WO | 2011000770 A1 | 1/2011 |

OTHER PUBLICATIONS

PCT Pat. App. No. PCT/US2012/053946, Written Opinion of the International Searching Authority, Mailed Mar. 12, 2013, 6 Pages.

Dasgupta et al., Social Ties and their Relevance to Churn in Mobile Telecom Networks, Proceedings of 11th ACM International Conference on Extending Database Technology, Mar. 25-30, 2008, pp. 668-677.

Onnela et al., Structure and tie strengths in mobile communication networks, Proceedings of the National Academy of Sciences of the United States, vol. 104, No. 18, May 1, 2007, pp. 7332-7336.

Richter et al., Predicting customer churn in mobile networks through analysis of social groups, Proceedings of SIAM International Conference on Data Mining, Apr. 29-May 1, 2010, pp. 732-741.

Seshadri et al., Mobile Call Graphs: Beyond Power-Law and Lognormal Distributions, Proceedings of 14th ACM Conference on Knowledge Discovery and Data Mining, Aug. 24-27, 2008, pp. 596-604.

Nanavati et al., On the Structural Properties of Massive Telecom Call Graphs: Findings and Implications, Proceedings of 15th ACM Conference on Information and Knowledge Management, Nov. 5-11, 2006, pp. 435-444.

Granovetter, The Strength of Weak Ties, American Journal of Sociology, vol. 78, Issue 6, May 1973, pp. 1360-1380.

Kunegis et al., The Slashdot Zoo: Mining a Social Network with Negative Edges, Proceedings of 18th ACM Conference on the World Wide Web, Apr. 20-24, 2009, pp. 741-750.

Mislove et al., Growth of the Flickr Social Network, Proceedings of 1st Workshop on Online Social Networks, 2008, pp. 25-30.

Mislove et al., Measurement and Analysis of Online Social Networks, Proceedings of the 7th ACM SIGCOMM Conference on Internet Measurement, 2007, pp. 29-42.

Alcatel-Lucent Brochure, Listen Up: Is Servicing Customers a Cost or an Investment?; 2011, 4 pages.

Alcatel-Lucent Strategic White Paper No. CM2023110603(08); Customer Experience Transformation via Analytics; 2011, 12 pages.

Alcatel-Lucent Brochure No. M2012053092(June), Customer Experience Analytics Deliver the Competitive Edge, Mobile Analytics Release 1.0; Jun. 2012, 6 pages.

English Bibliography for Japanese Patent Application Publication No. JP2010211287A, published on Sep. 24, 2010, printed from Thomson Innovation on Sep. 2, 2015, 3 pp.

English Bibliography for Japanese Patent Application Publication No. JP2010165166A, published on Jul. 29, 2010, printed from Thomson Innovation on Sep. 3, 2015, 3 pp.

English Bibliography for Japanese Patent Application Publication No. JP2008178072A, published on Jul. 31, 2008, printed from Thomson Innovation on Sep. 2, 2015, 3 pp.

English Bibliography for Japanese Patent Application Publication No. JP2005522096A, published on Jul. 21 2005, printed from Thomson Innovation on Sep. 2, 2015, 3 pp.

* cited by examiner

METHOD AND APPARATUS FOR DERIVING COMPOSITE TIE METRIC FOR EDGE BETWEEN NODES OF A TELECOMMUNICATION CALL GRAPH

This application is based on and claims priority to U.S. Provisional Application No. 61/532,151, filed Sep. 8, 2011, which is incorporated herein by reference in its entirety.

BACKGROUND

This disclosure relates to a process for deriving a composite tie metric for an edge between nodes of a telecommunication call graph based on multiple attributes of the edge. For example, the disclosure describes an exemplary embodiment of a method for deriving a composite tie metric for the edge that takes into account values of the multiple attributes for the edge, distribution of values for the multiple attributes of edges in the telecommunication call graph, conversion of the multiple attributes to a common scale, and weighting the multiple attributes in relation to sensitivity of the composite tie metric to the relative contribution of each attribute. The disclosure also describes an exemplary embodiment of an apparatus for deriving a composite tie metric for the edge based on historical data records for communications via a telecommunication network associated with the telecommunication call graph. Various embodiments of the methods and apparatus described herein may be used in conjunction with providing advice to service provider regarding churn prediction. However, methods and apparatus described herein may be used for other purposes, such as prediction of telecommunication service adoption, targeted advertisement, targeted marketing, anomaly detection, and other uses that can benefit from prediction of user behavior.

Social Network Analysis (SNA) is a powerful approach used to better understand the behaviors and relationships of users. SNA is traditionally applied in the context of online social networks (OSNs) such as Facebook, Flickr, and Twitter, where users can directly establish ties, share information, and join groups to connect to users with similar interests. In these networks, SNA operates over attributes that directly imply a social connection between users. For example, the fact that two users are friends on an OSN, that they belong to the same groups, or that they share information with each other can each be used individually to infer that a social tie exists.

Such OSNs contain causal information, that is, data attributes which imply the existence of a social tie. There exist other social networks, however, where only the effects of a social tie are observable. Each effect, taken alone, does not directly suggest social tie strength. Mobile call graphs are an example of such a social network. In a mobile call graph, the effects of a strong social tie may include a large number of calls placed, a long time spent talking, and many calls during weekend and evening hours. By themselves, however, none of the attributes directly imply the tie strength. For example, a user may call a bank to check balances and pay bills more times than they call a friend, even though friendship is a stronger social tie.

Mobile call graphs represent the way in which a large number of users communicate with each other, and these patterns of communication are related to the social ties between people. Thus, studies that apply SNA to mobile call graphs are rising in popularity. Such studies, however, only pick a single feature about the calls made between two users to define a social relationship. As a result, the conclusions drawn by these studies are based only on a single effect of a possible social relationship that exists. In order to make observations about a call graph that more faithfully considers the social relationship between users, an improved measure of tie strength is needed.

For additional information on studies that apply SNA to mobile call graphs, see, for example: i) Dasgupta et al., Social Ties and their Relevance to Churn in Mobile Telecom Networks, Proceedings of 11$^{th}$ ACM International Conference on Extending Database Technology, Mar. 25-30, 2008, pp. 668-677; ii) Onnela et al., Structure and tie strengths in mobile communication networks, Proceedings of the National Academy of Sciences of the United States, vol. 104, no. 18, May 1, 2007, pp. 7332-7336; iii) Richter et al., Predicting customer churn in mobile networks through analysis of social groups, Proceedings of SIAM International Conference on Data Mining, Apr. 29-May 1, 2010, pp. 732-741; iv) Seshardi et al., Mobile Call Graphs: Beyond Power-Law and Lognormal Distributions, Proceedings of 14$^{th}$ ACM Conference on Knowledge Discovery and Data Mining, Aug. 24-27, 2008, pp. 596-604; and v) Nanavati et al., On the Structural Properties of Massive Telecom Call Graphs: Findings and Implications, Proceedings of 15$^{th}$ ACM Conference on Information and Knowledge Management, Nov. 5-11, 2006, pp. 435-444. The contents of these five documents are fully incorporated herein by references.

Existing solutions to the problem of calculating social tie strength are applicable to online social networks (OSN) where causal information exists, that is, data attributes exist that imply the existence of a social tie. For example, the fact that two users are friends on an OSN, that they belong to the same groups, or that they share information with each other can each be used individually to infer that a social tie exists. For phone networks, however, only the effects of a social tie are observed. Each effect, taken alone, does not directly suggest tie strength. In a mobile call graph, for example, the effects of a strong social tie may include a large number of calls placed, a long time spent talking, and many calls during weekend and evening hours. By themselves, however, none of the attributes directly imply the tie strength. For example, a user may call a bank to check balances and pay bills more times than they call a friend, even though friendship is a stronger social tie.

There are a number of studies that apply SNA to mobile call graphs. Such studies, however, only pick a single feature about the calls made between two users to define a social relationship. As a result, the conclusions drawn by these studies are based only on a single effect of a possible social relationship that exists. In order to make observations about a call graph that more faithfully considers the social relationship between users, an improved measure of tie strength is needed.

Detecting anomalous behavior on mobile call graphs has several advantages—links where the usage drops significantly can be early indicators of nodes likely to churn in the future due to the reduced calling activity. On the other hand, significantly increased activity can indicate the forming of new ties and likely links for influence propagation. Anomaly detection across call graphs has applications for law enforcement agencies. Overseas calling, calls placed during unusual hours of the day, increased calling activity between certain nodes, and even the underuse or overuse of a service (associated with 'throw-away' phones) may be detected as anomalous signals that law enforcement agencies utilize when investigating a case. Use of the composite tie variation metric facilitates anomaly detection by incorporating abnormal activity across many attributes into a single metric.

Anomaly detection is also applicable to monitoring traffic on a link in a telecommunications network. A telecommunications network is comprised of network nodes (i.e., telecom equipment) and links that connect the different network nodes and transport traffic. In order to obtain the best performance from the network, it is beneficial to have the links at a certain level of activity and to be able to detect if the links deviate from their normal expected behavior. For example, an over loaded link may degrade performance and bring down the network, while an under-utilized link represents lost revenue opportunity. Detection of anomalous behavior of links enables an operator to take actions and rectify the situation. For accurate anomaly detection one needs to take into account multiple factors of performance of the link; not just a single measurement.

For these and other reasons, there is a need to define a composite metric representative of edges between nodes of a telecommunication call graph based on multiple characteristics of the edges.

SUMMARY

In one aspect, a method for deriving a composite tie metric for an edge between nodes of a telecommunication call graph is provided. In one embodiment, the method includes: receiving a plurality of descriptive data at a computing device from a remote storage device, wherein the plurality of descriptive data includes original values $x_{i,j}$ for a plurality of descriptive attributes j associated with a telecommunication call graph formed by a plurality of edges i between a plurality of nodes, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$; at least temporarily storing the plurality of descriptive data in a local storage device; determining scaling factors for each descriptive attribute j in a manner that takes into account a distribution of the original values $x_{i,j}$ for the corresponding descriptive attribute j and a common base for the plurality of descriptive attributes j; determining weighting factors for each descriptive attribute j; and computing a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$, wherein the plurality of descriptive attributes j include the first attribute $j_1$ and the second attribute $j_2$. It is understood that the process for deriving the composite tie metric described herein can be used for any number of attributes beyond the exemplary first and second attributes.

In another aspect, an apparatus for deriving a composite tie metric for an edge between nodes of a telecommunication call graph is provided. In one embodiment, the apparatus includes: a data communication module configured to receive a plurality of descriptive data from a remote storage device, wherein the plurality of descriptive data includes original values $x_{i,j}$ for a plurality of descriptive attributes j associated with a telecommunication call graph formed by a plurality of edges i between a plurality of nodes, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$; a local storage device configured to at least temporarily store the plurality of descriptive data; a scaling/weighting processor configured to determine scaling factors for each descriptive attribute j in a manner that takes into account a distribution of the original values $x_{i,j}$ for the corresponding descriptive attribute j and a common base for the plurality of descriptive attributes j and configured to determine weighting factors for each descriptive attribute j; and a composite tie metric processor configured to compute a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$, wherein the plurality of descriptive attributes j include the first attribute $j_1$ and the second attribute $j_2$.

In yet another aspect, a non-transitory computer-readable medium storing program instructions that, when executed by a processor, cause a computing device to perform a method for deriving a composite tie metric for an edge between nodes of a telecommunication call graph is provided. In one embodiment, the method includes: after receiving a plurality of descriptive data from a remote storage device that includes original values $x_{i,j}$ for a plurality of descriptive attributes j associated with a telecommunication call graph formed by a plurality of edges i between a plurality of nodes, determining scaling factors for each descriptive attribute j in a manner that takes into account a distribution of the original values $x_{i,j}$ for the corresponding descriptive attribute j and a common base for the plurality of descriptive attributes j, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$; determining weighting factors for each descriptive attribute j; and computing a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$, wherein the plurality of descriptive attributes j include the first attribute $j_1$ and the second attribute $j_2$.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
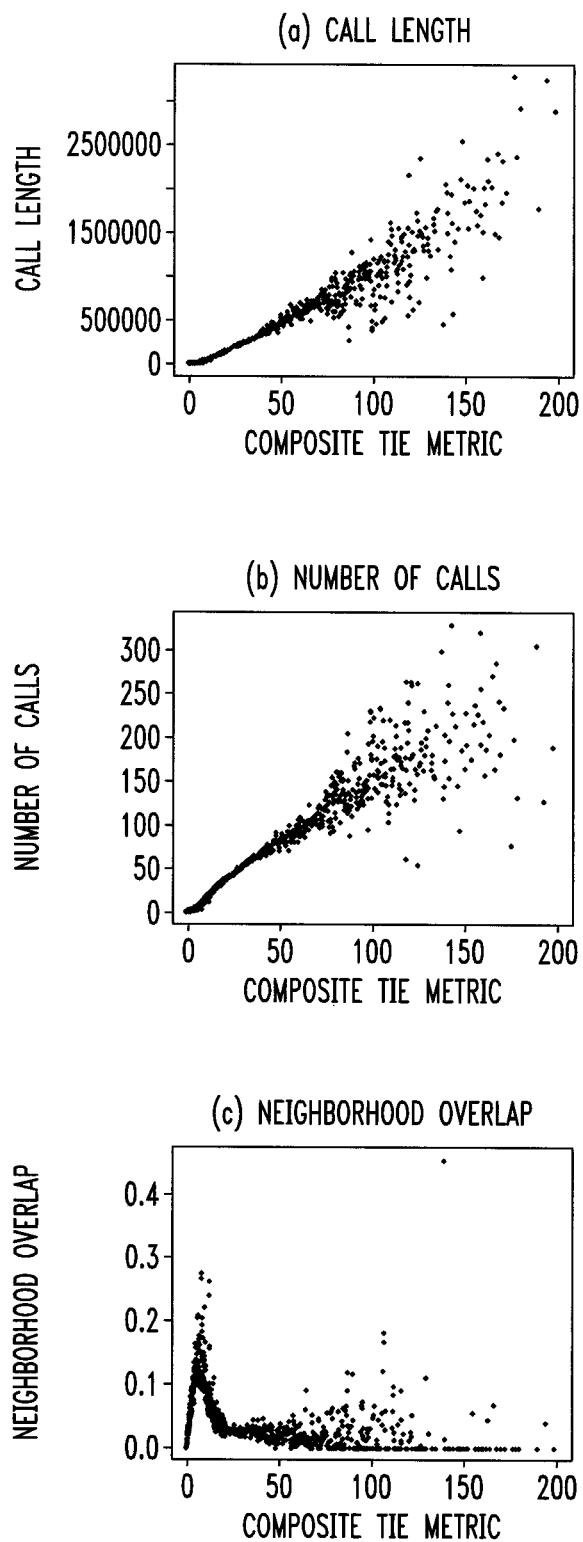
FIG. 1 is a set of graphs showing correlation between a composite tie metric and several exemplary attributes of edges in a telecommunication call graph.

In its whole, the disclosure describes two processes for deriving edge metrics. The first metric is a measurement of a variation-based score for a telecommunication graph edge, entailing the deviation of a combination of multiple attribute values from the attributes mean. This process is based on the use of the Principle Component Analysis (PCA) method. This embodiment may be used to detect anomalous behavior. The second process comprises computation of a metric that relates to social tie strength. The second process can be used to understand social influence of a user on the behavior of other users.

This disclosure, for example, examines a mobile call graph using an approach to measure the composite tie metrics between users. Various embodiments of an algorithm to quantify composite tie metrics through the synthesis of many calling attributes whose values are the effects of a social tie are disclosed herein. For additional information on tie strength, see, for example, Granovetter, The Strength of Weak Ties, American Journal of Sociology, Vol. 78, Issue 6, May 1973, pp. 1360-1380, the contents of which are fully incorporated herein by reference. Various embodiments of the algorithm can be applied to a call graph provided by a major mobile service provider to study the relationship between composite tie metrics and call graph structure.

In one exemplary embodiment of the algorithm, a mobile call graph is defined as a simple directed graph $G=(V, E)$ where the set of vertices V represent mobile phone users, and an edge $e=(a, b) \in E$ iff $a, b \in V$ and a placed a call to b. G represents the $|E|=m$ ties among the $|V|=n$ users. The objective is to define a weighting function $S:E \rightarrow R$ that maps every directed edge to a value characterizing the relationship between the users incident on the edge.

In this embodiment, each edge is represented as a vector of k attributes. The corresponding vectors of k attributes can be composed in the m×k matrix E, where a row of E corresponds to an edge of G and $|E|_{ij}$ is the value of attribute j for edge i. In order to map the row vectors of E to a value characterizing a relationship between the users incident on the edge, an approach, inspired by principle component analysis (PCA), is applied that projects the data onto a subspace which better represents the variation existing within the data. The projection uses an orthogonal basis set of vectors that point in the directions where the variation in the data is the largest (referred to as principle components (PC)). This set is given by the eigenvectors of the covariance matrix $\Sigma$ of E. For additional information on PCA, see, for example, Jackson, A User's Guide to Principal Components, Wiley-Interscience, Sep. 10, 2003, 592 pages, the contents of which are fully incorporated herein by reference.

The sum of the eigenvalues of $\Sigma$ is equal to the total variance within the data which is the same as the dimensionality of the data if it has zero mean and unit variance. In other words, the eigenvalues of $\Sigma$ relate the amount of variation that is explained by each dimension of the projected data to the variation along the dimensions of the original data. Each component of the projected data is multiplied by the corresponding eigenvalue. These weighted components are summed to get a value characterizing a relationship among the two users. This gives the dimensions where the data exhibits very large variation additional influence in the composite tie metric value.

In another embodiment, the algorithm is summarized as follows:

1) Set $|E|_{ij} = |E|_{ij} - \frac{1}{m}\sum_{i=1}^{m} |E|_{ij}$ for all $j$;

2) Set $|E|_{ij} = \frac{|E|_{ij}}{\sigma_j}$, with $\sigma_j^2$ as the variance of attribute $j$;

3) Find the covariance matrix $\Sigma$ of $E$;

4) Find $\Lambda$, a $k \times 1$ column vector where $\Lambda_i$ is the $i^{th}$ largest eigenvalue of $\Sigma$;

-continued

5) Find $U$, a $k \times k$ matrix whose $i^{th}$ column is the right eigenvector corresponding to $\Lambda_i$; and 6) The composite tie metric for edge $e_i$ is given by $i^{th}$ component of the vector $S = E \cup \Lambda$.

In another embodiment, various aspects of an exemplary embodiment of an algorithm for computing a composite tie metric for edges can be used to study the social decomposition of a telecommunication call graph. The algorithm uses an approach to quantify the social tie strength between two users that offers higher fidelity by considering any number of observations. For additional information on such an example, see, for example, Doran et al., Examining the Social Decomposition of Mobile Call Graphs in U.S. Provisional Application No. 61/532,151, filed Sep. 8, 2011, to which priority is claimed, which is incorporated herein by reference in its entirety.

Various embodiments of a method to calculate the composite tie metric between subscribers of a phone network are disclosed herein. These embodiments build upon the principles of social network analysis (SNA) and extend SNA to the study of the structure of phone networks. The problem of deriving composite tie metrics over social networks within call graphs is addressed by developing an algorithm that synthesizes many calling attributes whose values are the effects of a social tie.

In one embodiment of the algorithm, initially, a collection of n attributes are extracted from calling data that may represent the effect of a social tie, such as call duration, number of calls made between two users, and the number of other users that both these users both contact directly (and are common to both). A mobile call graph is constructed where a node represents a user and a link between two nodes represents a directed social tie. A directed social tie from A to B exists if and only if A made at least one call to B. Each social tie in the graph is represented as an n-dimensional vector whose component values correspond to each of the n attributes extracted from the calling data. Each of these n-dimensional vectors are mapped to a single value using the algorithm.

Even though there is no causal relationship between an individual feature and social tie strength, considering the way in which these social tie vectors vary within the n-dimensional space can be used to suggest the strength of a social tie because the value of many effects together more strongly suggests social tie strength. For example, the number of times that two people call each other is an effect of a social tie (more calls made between two people may suggest tie strength). In combining this information with other attributes, such as total time spent calling and common neighbors, a stronger inference can be made about tie strength.

However, the values of multiple types of attributes should not be directly combined when attempting to derive a value for a composite tie metric for several reasons. First, each attribute may be measured with different scales, making their direct combination meaningless. In order to address this problem, the data can be centered so that it has zero mean and then scale every component so it has unit variance. Another reason is that the strength of a social tie affects each attribute to a different degree. If social tie strength has a small impact on the value of an attribute, then this attribute should not be given as much weight when mapping the social tie vector to a value. Furthermore, the data also exhibits different amounts of variation when considering multiple attributes together. To address this problem, the n directions in the n-dimensional space where the data varies the most can be identified and projected into another n-dimensional space along these directions. The result of this data transformation is a collection of alternate tie metric vectors whose variation is maximal along each component. The combined variation along these projected components captures a majority of the variation that existed within the original data.

The data projection described above is motivated by the traditional data mining technique Principle Component Analysis (PCA). PCA identifies the directions of largest variance in the dataset as the eigenvectors of the covariance matrix of the dataset. This means that each component of the projected data corresponds to one of the eigenvectors used in the data projection. Furthermore, the eigenvalue of that eigenvector represents the proportion of the variance in the original data that is captured by that component. Thus, the composite tie metric is defined as the linear combination of each projected component multiplied by its corresponding eigenvalue.

In another embodiment, the algorithm is summarized as follows:
1) Represent each social tie as an n-dimensional vector whose components correspond to the value of a call attribute;
2) Scale the vectors so that their components have zero mean and unit variance;
3) Find the covariance matrix of the social tie vectors;
4) Find the set of eigenvectors for the covariance matrix and their corresponding eigenvalues;
5) Project the data onto a new n-dimensional space using the eigenvectors; and
6) The composite tie metric is given as the sum of every component of its projected vector, multiplied by its corresponding eigenvalue.

Figure 2:
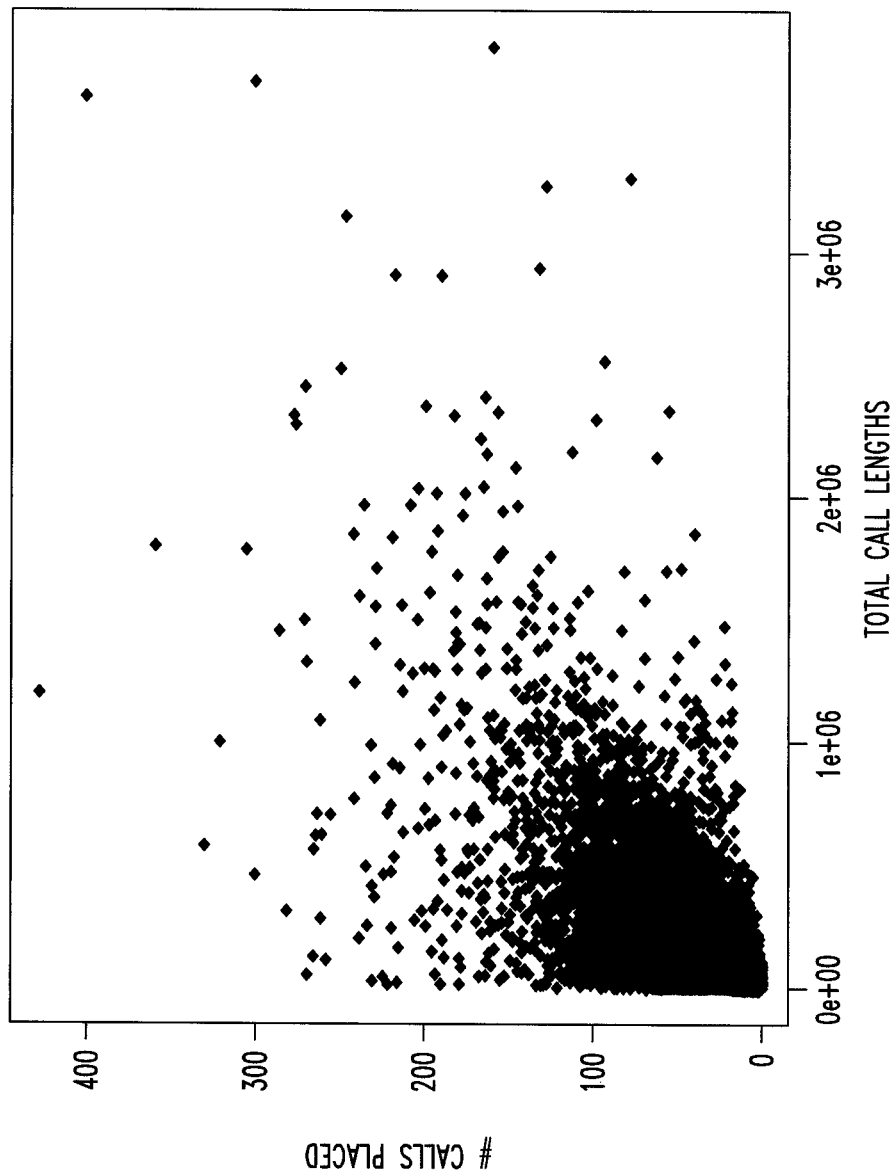
FIG. 2 is a graph showing composite tie metric quality for several exemplary attributes of edges in a telecommunication call graph.

The quality of the resulting tie is shown in FIG. 2. For example, the three attributes (i.e., total call duration, number of calls placed, and the proportion of neighbors that are the same between two nodes) in FIG. 2 can be used to demonstrate the approach. The resulting tie metric values follow expectations about how tie strength should impact the value of these attributes. Call length and the number of calls placed are positively correlated with the derived tie metric value, while the number of common neighbors are strongly impacted only when the number of calls placed and the call length are both low.

Generally, various embodiments of the algorithm provide for calculation of a composite tie metric between users on a network based on several attributes of the links between users. Social tie strength has implications for how information spread occurs in social networks. For example, for diffusion with respect to adoption of new products and services, customer churn behavior, etc. A better approach in computing the composite tie metric will improve the results of such solutions and increase the commercial value of them to service providers.

The algorithm develops a method for calculating social a composite tie metric for networks, such as mobile phone networks, where only the effects of a social tie are observed. The existing solutions for calculating social tie strength are applicable to online social networks (OSN) where causal information exists, that is, data attributes exist that imply the existence of a social tie. In addition, the various embodiments of the algorithm disclosed herein define an extensible framework where an arbitrary number of information variables about social ties or their effects can be considered.

The algorithm can be also be applied to social networks other than call graphs. Moreover, in the era of "Big Data," analytics for business intelligence are being deployed in a range of industries, including telecommunications, to gain insights into customer behavior in the form of actionable intelligence. This intelligence can be used to design campaigns to enhance the customer experience, design loyalty campaigns, design programs to retain customers (reduce customer churn), enroll new customers, and to design programs to up-sell and cross-sell to increase customer lifetime value and optimize return on investment (ROI).

In yet another embodiment, a mathematical framework to derive a composite metric for an edge in a mobile call graph is presented. A single calling feature such as the frequency of calls between two users may not necessarily be a good indicator of their social tie strength; however, the value of the feature is likely influenced by the corresponding tie strength. For example, even though a high duration of calls or the frequency of calls between users does not imply high social tie strength, if two users share a strong social tie, one might expect them to call each other frequently and talk for long periods of time. Accordingly, because the values of the calling attributes are influenced by the strength of the underlying social relationship, they are a type of social tie effect. These effects, taken together, rather than individually, give a better view of the social ties between users.

The attributes of a connection between two users (e.g., total call duration and total number of calls) in a mobile call graph are typically correlated and are measured using different scales. This makes it difficult to combine these values in a meaningful way. To overcome the scaling difference, each attribute $x_i$ is normalized by dividing it by $|x_i|$, where $$|x_i| = \sqrt{\sum_{k=1}^{d} x_{ik}^2},$$

thus, rescaling each attribute to have unit length. For an edge with which n attributes are associated, a real positive value $w(x)$ is computed for the composite tie metric, where $x = \alpha_1 x_1 + \alpha_2 x_2 + \ldots + \alpha_n x_n$ is the weighted sum of the normalized attributes. Specifically, $w(x)$ is a monotonically increasing function of x given by $w(x) = 1 - \exp(-x/\epsilon^2)$.

Figure 3:
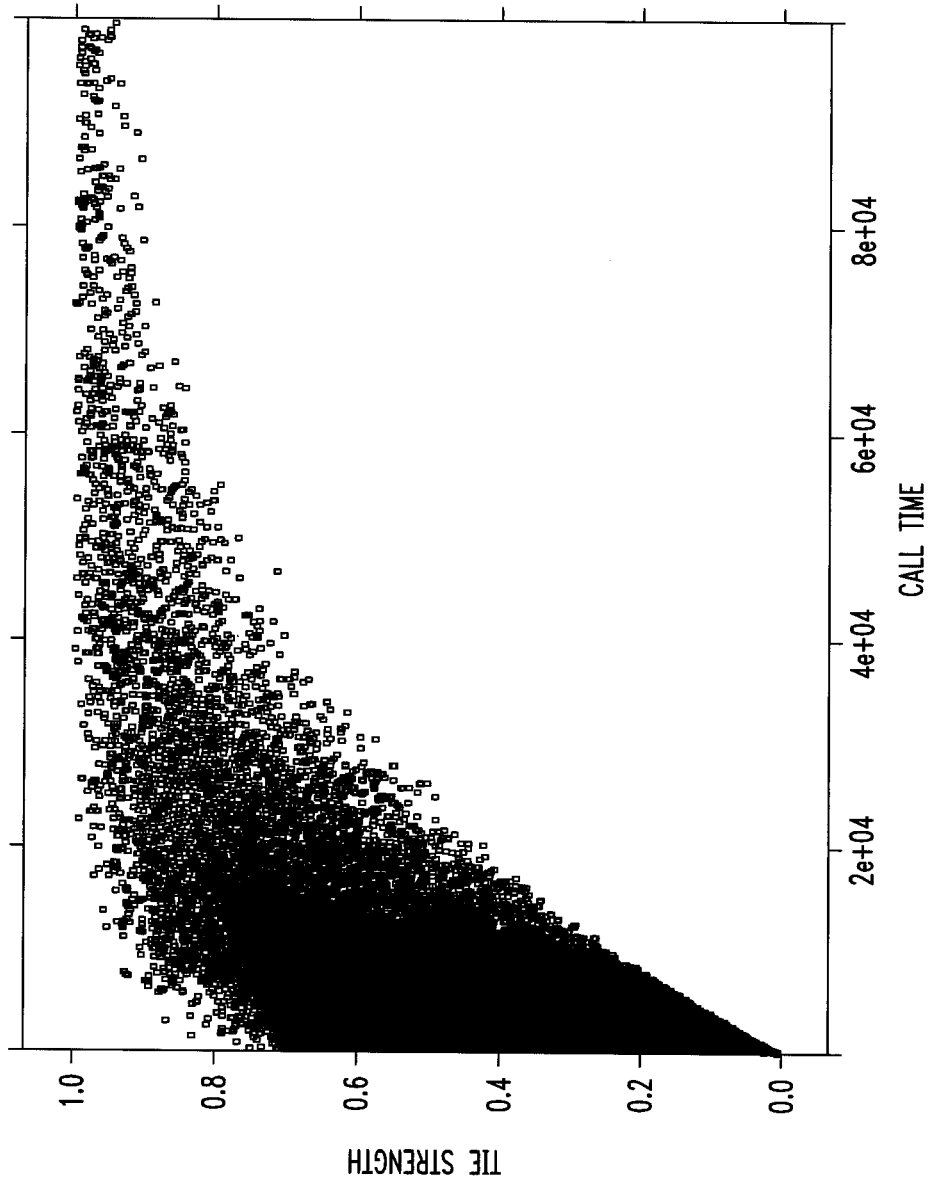
FIG. 3 is a graph showing composite tie metric quality for an exemplary attribute of edges in a telecommunication call graph.
Figure 4:
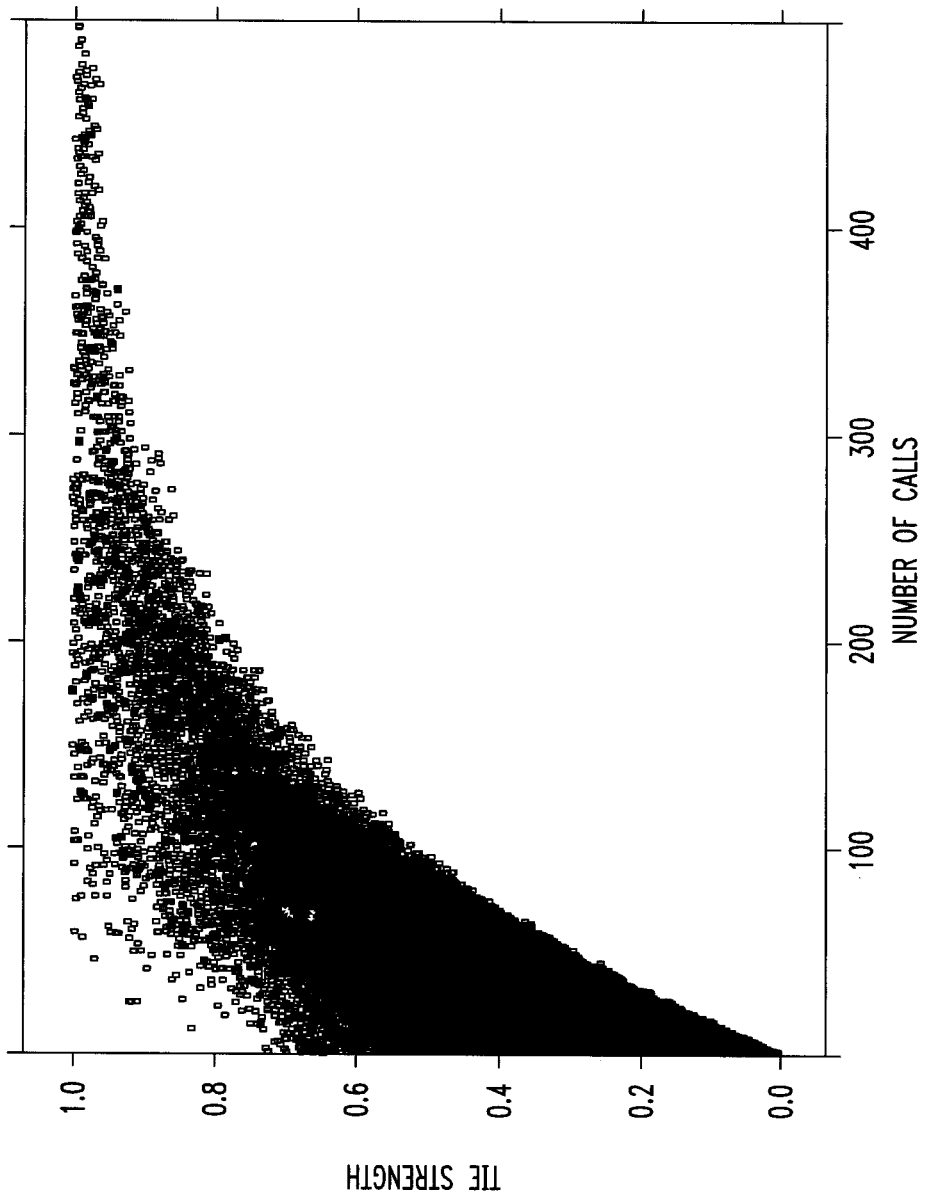
FIG. 4 is a graph showing composite tie metric quality for another exemplary attribute of edges in a telecommunication call graph.
Figure 5:
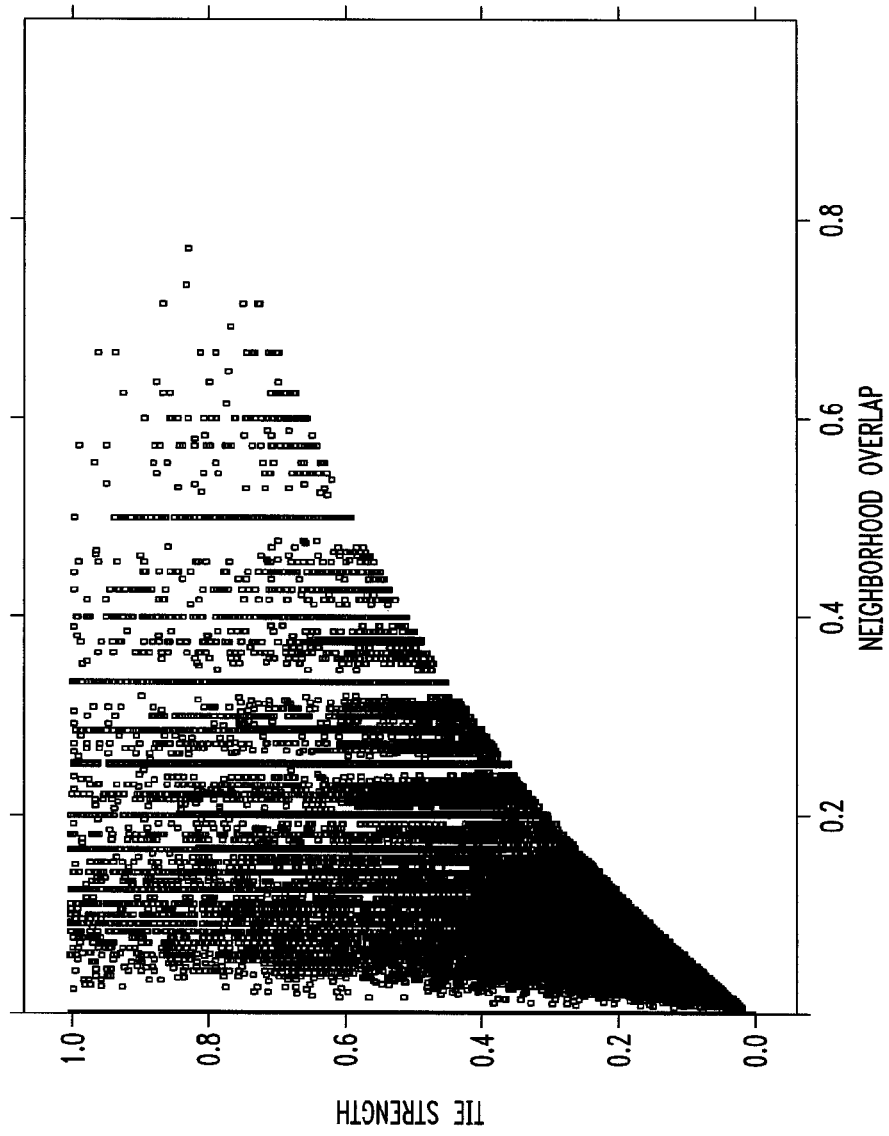
FIG. 5 is a graph showing composite tie metric quality for yet another exemplary attribute of edges in a telecommunication call graph.

Clearly, $w(x)$ is restricted to the interval [0,1], with the parameter $\epsilon$ controlling the rate of saturation. The formulation is based on the assumption that once a strong social connection is manifested, with high probability an "idea" (such as churning) will be transferred through the edge from one subscriber to another. The range of $\epsilon$ can be learned from training data. The quality of the resulting tie metrics are shown in FIGS. 3-5.

The embodiments described herein allow many link attributes, each representing some form of connection/relation between nodes A and B, to be considered in deriving the composite tie metric for the link (i.e., edge) between nodes A and B. Some exemplary link attributes include number of calls, duration of calls, direction of calls, reciprocity of calls, time/day of calls, amount spent, overlap of friends/neighbors, and frequency of calls within a time window. The various algorithms described herein combine the attributes of interest in a composite tie metric for the link. For example, the algorithms use a function (f) to combine several (i.e., more than one) link attributes to generate the composite tie metric.

The actual form of the function (f) may depend on the ultimate problem for which the resulting composite tie metric(s) would be used. For example, the algorithm may be tailored to provide composite tie metric(s) for use in churn prediction, anomaly detection, fraud detection, etc. The embodiments described herein include a PCA-based function that derives composite tie metrics that may be used for detecting anomalous links, such as those that exhibit characteristics that vary significantly from the normal (i.e., average). Other embodiments described herein use an exponential function to reflect tie strength, where the calculated values are normalized to between 0 and 1, and may be used for churn prediction. It is understood that many other forms of function (f) are possible for calculating the composite tie strength.

Figure 6:
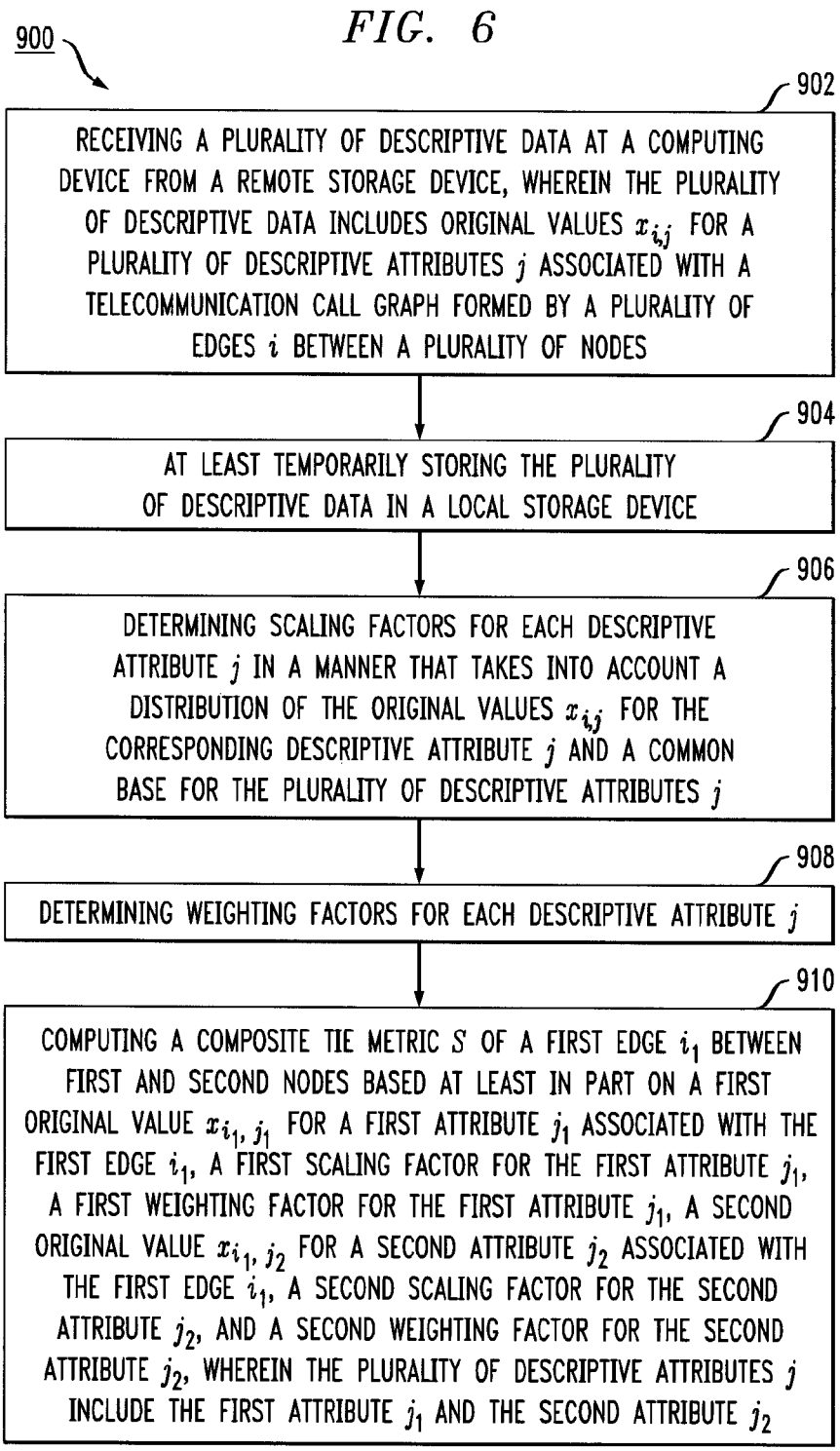
FIG. 6 is a flow chart of an exemplary embodiment of a process for deriving a composite tie metric for an edge between nodes of a telecommunication call graph.

With reference to FIG. 6, an exemplary embodiment of a process 900 for deriving a composite tie metric for an edge between nodes of a telecommunication call graph begins at 902 where a plurality of descriptive data is received at a computing device from a remote storage device. The plurality of descriptive data includes original values $x_{i,j}$ for a plurality of descriptive attributes j associated with a telecommunication call graph formed by a plurality of edges i between a plurality of nodes. Each edge i relates to two nodes of the plurality of nodes. Each original value $x_{i,j}$ relates to a unique edge i in the telecommunication call graph and a unique descriptive attribute j for the corresponding edge i. The unique edge i and unique descriptive attribute j forming an edge-attribute pair i,j relating to the corresponding original value $x_{i,j}$. The plurality of descriptive data is at least temporarily storing in a local storage device (904).

At 906, scaling factors for each descriptive attribute j are determined in a manner that takes into account a distribution of the original values $x_{i,j}$ for the corresponding descriptive attribute j and a common base for the plurality of descriptive attributes j. Weighting factors are determined for each descriptive attribute j (908). At 910, a composite tie metric S of a first edge i between first and second nodes is computed based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$. The plurality of descriptive attributes j include the first attribute $j_1$ and the second attribute $j_2$.

In another embodiment of the process 900, the plurality of edges i and the plurality of nodes form a telecommunication network and the descriptive data is associated with communication sessions utilizing resources of the telecommunication network during a predetermined time. In this embodiment, each edge i represents a connection through which at least one communication session was connected during the predetermined time period. In a further embodiment, the telecommunication network comprises at least one of a wireless network, a mobile network, and a cellular network. In another further embodiment, the first node represents a first identification number associated with a first user device and the second node represents a second identification number associated with a second user device. In yet another further embodiment, at least one of the first and second nodes represents a group of identification numbers associated with a corresponding group of user devices. In still another further embodiment, the communication sessions comprise at least one of voice calls, text messages, multimedia messages, short message service (SMS) messages, instant messages (IMs), and data transfers. In still yet another further embodiment of the process 900, the plurality of descriptive attributes j associated with the plurality of edges j comprise at least one of an amount of communication sessions over the corresponding edge j, an accumulated duration measure for communication sessions over the corresponding edge j, an amount of common neighbors for the nodes associated with the corresponding edge j, and one or more demographic parameters for the nodes associated with the corresponding edge j.

In yet another embodiment of the process 900, the plurality of edges comprise directed edges reflecting whether each edge is out-going or incoming in relation to the nodes with which the corresponding edge is associated.

Figure 7:
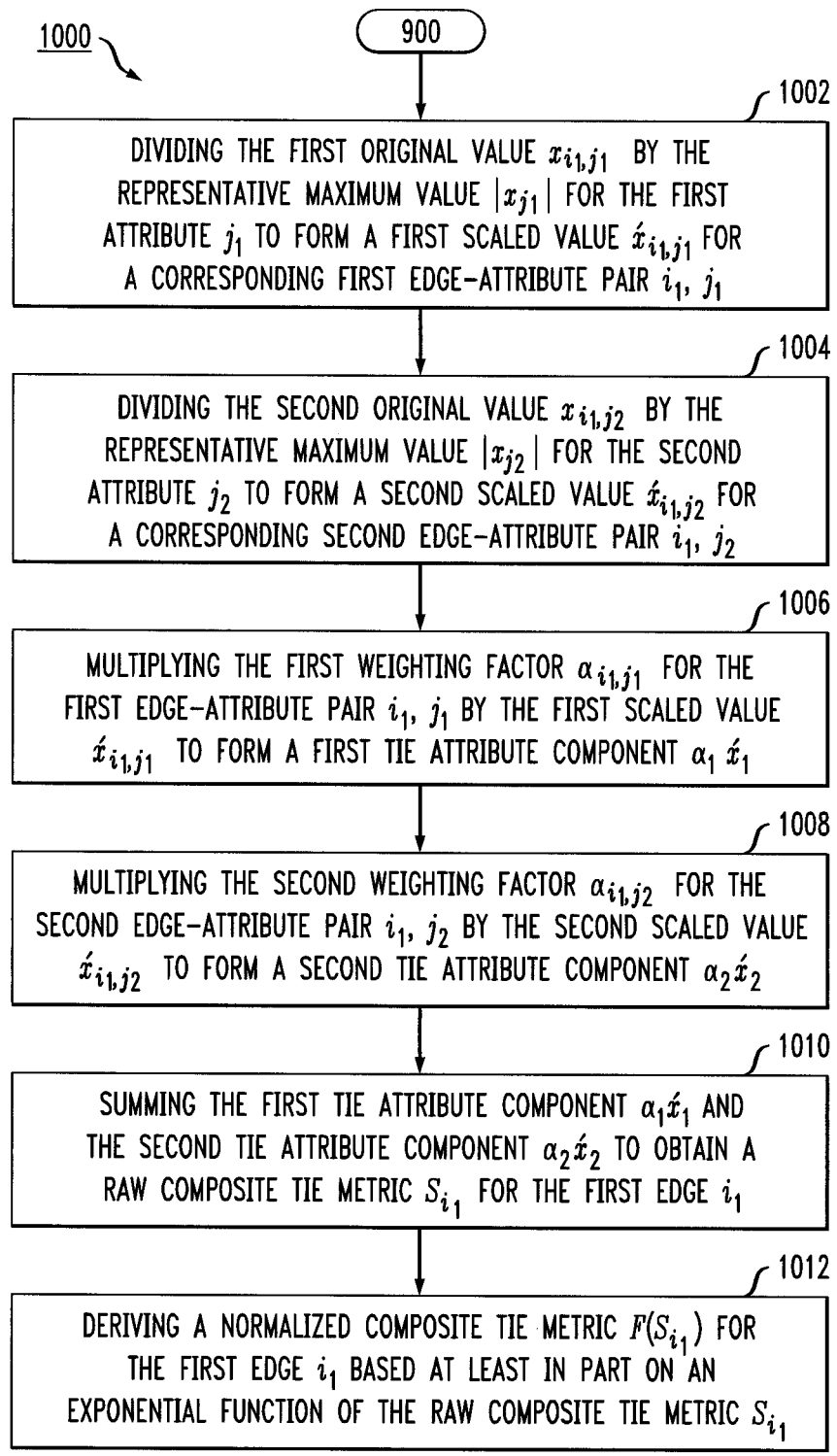
FIG. 7, in conjunction with FIG. 6, is a flow chart of another exemplary embodiment of a process for deriving a composite tie metric for an edge between nodes of a telecommunication call graph.

With reference to FIGS. 6 and 7, another exemplary embodiment of a process 1000 for deriving a composite tie metric for an edge between nodes of a telecommunication call graph includes the process 900 of FIG. 6 and expands upon 906, 908, and 910. In this embodiment of the process 1000, the determined scaling factor for each descriptive attribute j is based at least in part on determining a representative maximum value $|x_j|$ for the corresponding descriptive attribute j to establish a unit base for each descriptive attribute j as the common base. At 1002, the first original value $x_{i_1,j_1}$ divided by the representative maximum value $|x_{j_1}|$ for the first attribute $j_1$ to form a first scaled value $\dot{x}_{i_1,j_1}$ for a corresponding first edge-attribute pair $i_1,j_1$. The second original value $x_{i_1,j_2}$ is divided by the representative maximum value $|x_{j_2}|$ for the second attribute $j_2$ to form a second scaled value $\dot{x}_{i_1,j_2}$ for a corresponding second edge-attribute pair $i_1,j_2$ (1004).

At 1006, the first weighting factor $\alpha_{i_1,j_1}$ for the first edge-attribute pair $i_1,j_1$ is multiplied by the first scaled value $\dot{x}_{i_1,j_1}$ to form a first tie attribute component $\alpha_1 \dot{x}_1$. The second weighting factor $\alpha_{i_1,j_2}$ for the second edge-attribute pair $i_1,j_2$ is multiplied by the second scaled value $\dot{x}_{i_1,j_2}$ to form a second tie attribute component $\alpha_2 \dot{x}_2$ (1008). At 1010, the first tie attribute component $\alpha_1 \dot{x}_1$ and the second tie attribute component $\alpha_2 \dot{x}_2$ are summed to obtain a raw composite tie metric $S_{i_1}$ for the first edge $i_1$. A normalized composite tie metric $F(S_{i_1})$ is derived for the first edge $i_1$ based at least in part on an exponential function of the raw composite tie metric $S_{i_1}$ (1012). It is understood that the process 1000 for deriving the composite tie metric described herein can be used for any number of attributes beyond the exemplary first and second attributes.

In another embodiment of the process 1000, the representative maximum value $|x_j|$ for each descriptive attribute j is based at least in part on the expression:

$$|x_j| = \sqrt{\sum_{i=1}^{n} x_{i,j}^2} \qquad (1)$$

where n defines a number of edges included in me plurality of edges.

In yet another embodiment of the process 1000, the first scaled value $\dot{x}_{i_1,j_1}$ is based at least in part on the expression:

$$\dot{x}_{i_1,j_1} = \frac{x_{i_1,j_1}}{|x_{j_1}|} \qquad (2)$$

and the second scaled value $\dot{x}_{i_1,j_2}$ is based at least in part on the same expression for $x_{i_1,j_2}$ and $|x_{j_2}|$.

In still another embodiment of the process 1000, the raw composite tie metric $S_{i_1}$ for the first edge $i_1$ is based at least in part on the expression:

$$S_i = \alpha_1 \dot{x}_1 + \alpha_2 \dot{x}_2 \qquad (3).$$

In still yet another embodiment of the process 1000, the normalized composite tie metric $F(S_{i_1})$ for the first edge $i_1$ is based at least in part on the expression:

$$F(S_i) = 1 - \exp\left(-\frac{S_i}{\varepsilon^2}\right) \qquad (4)$$

where $\varepsilon$ is a constant that controls saturation of the normalized composite tie metric $F(S_i)$ in conjunction with the raw tie strength $S_i$.

Figure 8:
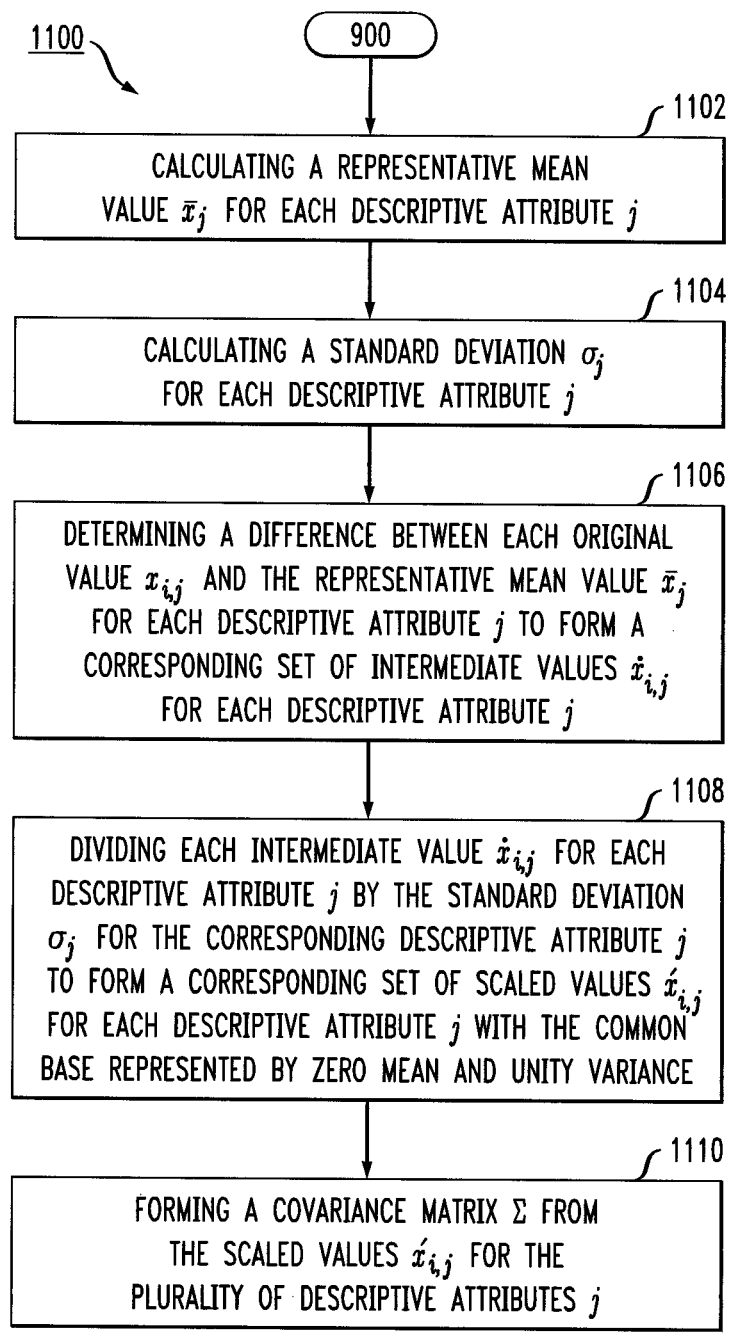
FIG. 8, in conjunction with FIG. 6, is a flow chart of yet another exemplary embodiment of a process for deriving a composite tie metric for an edge between nodes of a telecommunication call graph.

With reference to FIGS. 6 and 8, yet another exemplary embodiment of a process 1100 for deriving a composite tie metric for an edge between nodes of a telecommunication call graph includes the process 900 of FIG. 6 and expands upon 906 and 908. In this embodiment, the process 1100 includes calculating a representative mean value $\bar{x}_j$ for each descriptive attribute j (1102). At 1104, a standard deviation $\sigma_j$ is calculated for each descriptive attribute j. A difference between each original value $x_{i,j}$ and the representative mean value $\bar{x}_j$ is determined for each descriptive attribute j to form a corresponding set of intermediate values $\dot{x}_{i,j}$ for each descriptive attribute j (1106). At 1108, each intermediate value $\dot{x}_{i,j}$ for each descriptive attribute j is divided by the standard deviation $\sigma_j$ for the corresponding descriptive attribute j to form a corresponding set of scaled values $\dot{x}_{i,j}$ for each descriptive attribute j with the common base represented by zero mean and unity variance. A covariance matrix $\Sigma$ is formed from the scaled values $\dot{x}_{i,j}$ for the plurality of descriptive attributes j (1110).

In another embodiment of the process 1100, the representative mean values $\bar{x}_j$ for each descriptive attribute j are based at least in part on the expression:

$$\bar{x}_j = \frac{1}{n}\sum_{i=1}^{n} x_{i,j} \qquad (5)$$

where n defines a number of edges included in the plurality of edges.

In yet another embodiment of the process 1100, the intermediate values $\dot{x}_{i,j}$ are based at least in part on the expression:

$$\dot{x}_{i,j} = \frac{\bar{x}_j}{\sigma_j} \qquad (6)$$

for each descriptive attribute j.

Figure 9:
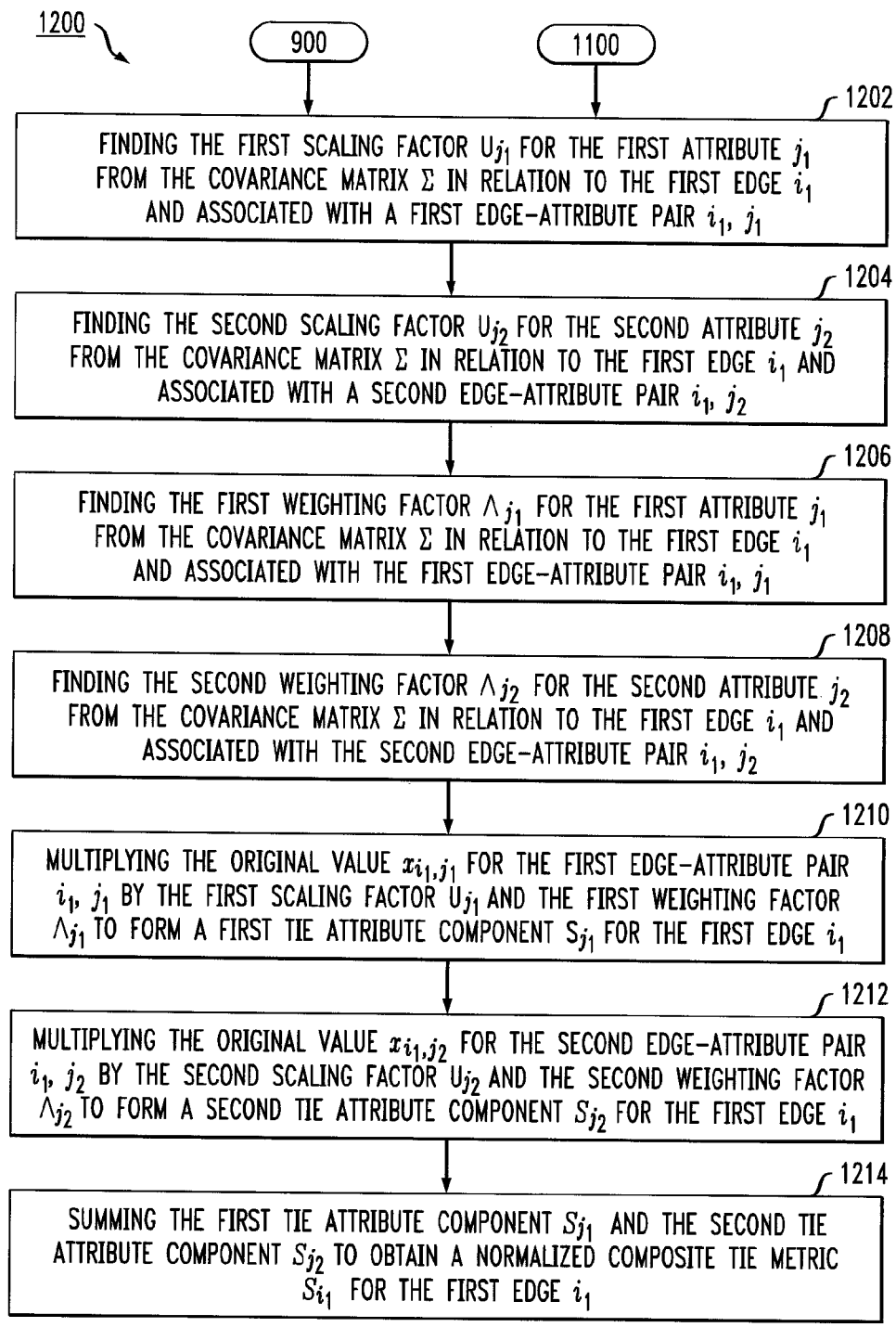
FIG. 9, in conjunction with FIGS. 6 and 8, is a flow chart of still another exemplary embodiment of a process for deriving a composite tie metric for an edge between nodes of a telecommunication call graph.

With reference to FIGS. 6, 8, and 9, still another exemplary embodiment of a process 1200 for deriving a composite tie metric for an edge between nodes of a telecommunication call graph includes the processes 900, 1100 of FIGS. 6 and 8 and expands upon 906, 908, and 910. In this embodiment, the process 1200 includes finding the first scaling factor $U_{j_1}$ for the first attribute $j_1$ from the covariance matrix $\Sigma$ in relation to the first edge $i_1$ and associated with a first edge-attribute pair $i_1,j_1$ (1202). At 1204, the second scaling factor $U_{j_2}$ for the second attribute $j_2$ is found from the covariance matrix $\Sigma$ in relation to the first edge $i_1$ and associated with a second edge-attribute pair $i_1,j_2$. The first weighting factor $\Lambda_{j_1}$ for the first attribute $j_1$ is found from the covariance matrix $\Sigma$ in relation to the first edge $i_1$ and associated with the first edge-attribute pair $i_1,j_1$ (1206). At 1208, the second weighting factor $\Lambda_{j_2}$ for the second attribute $j_2$ is found from the covariance matrix $\Sigma$ in relation to the first edge $i_1$ and associated with the second edge-attribute pair $i_1,j_2$. The original value $x_{i_1,j_1}$ for the first edge-attribute pair $i_1,j_1$ multiplied by the first scaling factor $U_{j_1}$ and the first weighting factor $\Lambda_{j_1}$ to form a first tie attribute component $S_{j_1}$ for the first edge $i_1$ (1210). At 1212, the original value $x_{i_1,j_2}$ for the second edge-attribute pair $i_1,j_2$ is multiplied by the second scaling factor $U_{j_2}$ and the second weighting factor $\Lambda_{j_2}$ to form a second tie attribute component $S_{j_2}$ for the first edge $i_1$. The first tie attribute component $S_{j_1}$ and the second tie attribute component $S_{j_2}$ summed to obtain a normalized composite tie metric $S_{i_1}$ for the first edge $i_1$ (1214). It is understood that the process 1200 for deriving the composite tie metric described herein can be used for any number of attributes beyond the exemplary first and second attributes.

In another embodiment of the process 1200, the first scaling factor $U_{j_1}$ is based on a first eigenvector from the covariance matrix $\Sigma$ that corresponds to the first weighting factor $\Lambda_{j_1}$ and the second scaling factor $U_{j_2}$ is based on an second eigenvector from the covariance matrix $\Sigma$ that corresponds to the second weighting factor $\Lambda_{j_2}$. In yet another embodiment of the process 1200, the first weighting factor $\Lambda_{j_1}$ and the second weighting factor $\Lambda_{j_2}$ are based on column vectors and eigenvalues from the covariance matrix $\Sigma$.

In still another embodiment of the process 1200, the first tie attribute component $S_{j_1}$ and the second tie attribute component $S_{j_2}$ for the first edge $i_1$ are based at least in part on the expression:

$$S_{j_n} x_{i_1,j_n} * U_{j_n} * \Lambda_{j_n}, \quad (7)$$

where n identifies the corresponding descriptive attribute j.

In still yet another embodiment of the process 1200, the normalized composite tie metric $S_{i_1}$ for the first edge $i_1$ is based at least in part on the expression:

$$S_{i_1} = S_{j_1} + S_{j_2} \quad (8).$$

Figure 10:
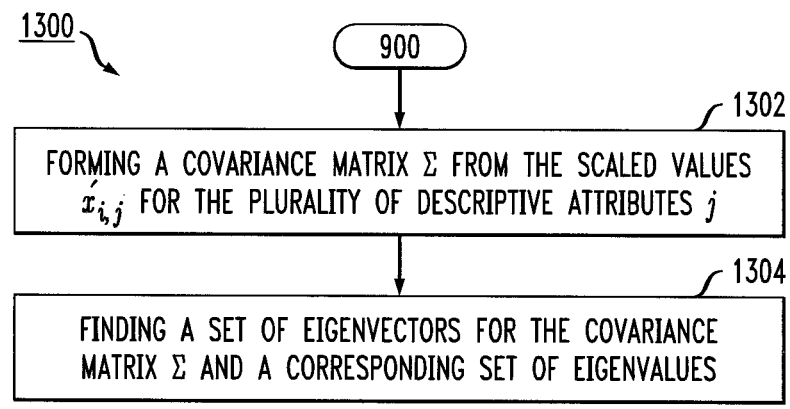
FIG. 10, in conjunction with FIG. 6, is a flow chart of still yet another exemplary embodiment of a process for deriving a composite tie metric for an edge between nodes of a telecommunication call graph.

With reference to FIGS. 6 and 10, yet another exemplary embodiment of a process 1300 for deriving a composite tie metric for an edge between nodes of a telecommunication call graph includes the process 900 of FIG. 6 and expands upon 906 and 908. In this embodiment of the process 1300, the scaling factors are determined such that a corresponding set of scaled values $\acute{x}_{i,j}$ formed from the original values $x_{i,j}$ for each descriptive attribute j such that the common base for the scaled values $\acute{x}_{i,j}$ for each descriptive attribute j reflects zero mean and unity variance. At 1302, a covariance matrix $\Sigma$ is formed from the scaled values $\acute{x}_{i,j}$ for the plurality of descriptive attributes j. A set of eigenvectors for the covariance matrix $\Sigma$ and a corresponding set of eigenvalues are found (1304).

Figure 11:
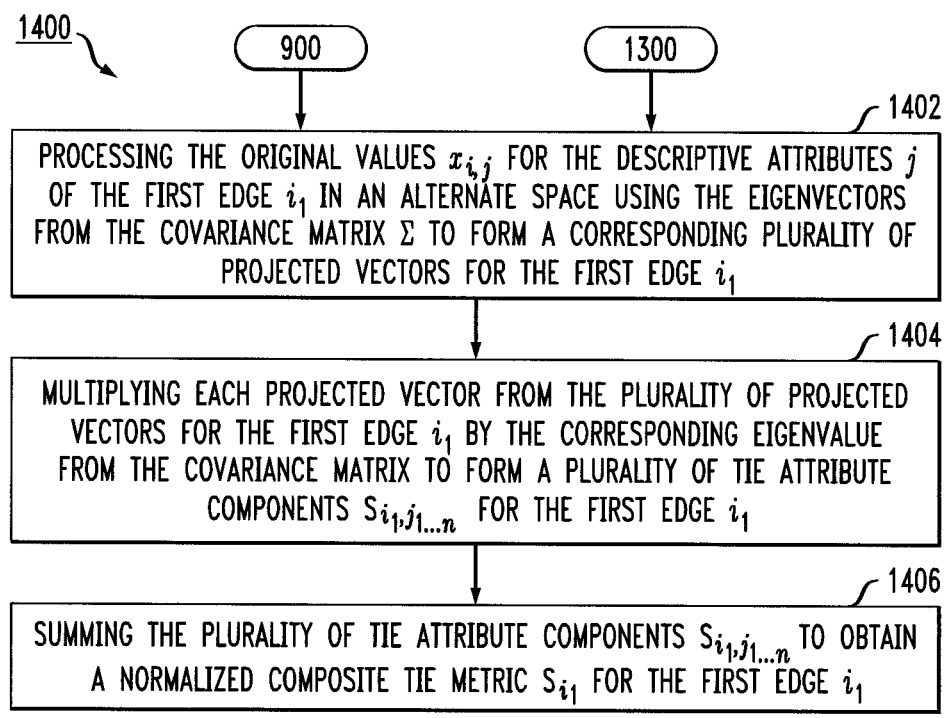
FIG. 11, in conjunction with FIGS. 6 and 10, is a flow chart of another exemplary embodiment of a process for deriving a composite tie metric for an edge between nodes of a telecommunication call graph.

With reference to FIGS. 6, 10, and 11, yet another exemplary embodiment of a process 1400 for deriving a composite tie metric for an edge between nodes of a telecommunication call graph includes the processes 900, 1300 of FIGS. 6 and 10 and expands upon 910. In this embodiment, the process 1400 includes processing the original values $x_{i,j}$ for the descriptive attributes j of the first edge $i_1$ in an alternate space using the eigenvectors from the covariance matrix $\Sigma$ to form a corresponding plurality of projected vectors for the first edge $i_1$ (1402). At 1404, each projected vector from the plurality of projected vectors for the first edge $i_1$ is multiplied by the corresponding eigenvalue from the covariance matrix to form a plurality of tie attribute components $S_{i_1,j_1 \ldots n}$ for the first edge $i_1$. The plurality of tie attribute components $S_{i_1,j_n}$ are summed to obtain a normalized composite tie metric $\acute{S}_{i_1}$ for the first edge $i_1$ (1406).

Figure 12:
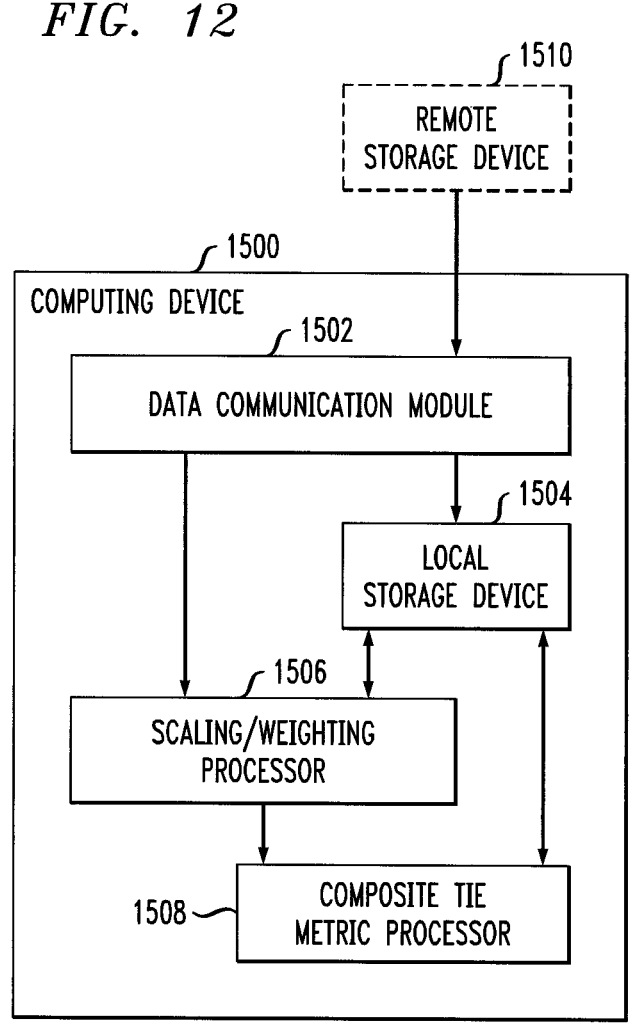
FIG. 12 is a block diagram of an exemplary embodiment of a computing device for deriving a composite tie metric for an edge between nodes of a telecommunication call graph.

With reference to FIG. 12, an exemplary embodiment of a computing device 1500 for deriving a composite tie metric for an edge between nodes of a telecommunication call graph includes a data communication module 1502, a local storage device 1504, a scaling/weighting processor 1506, and a composite tie metric processor 1508. In various embodiments, the computing device 1500 may include one or more servers, one or more computer work stations, one or more computer systems, one or more computers, one or more processors, or one or more of any other suitable type of computing device in any suitable combination.

The data communication module 1502 is configured to receive a plurality of descriptive data from a remote storage device 1510. The plurality of descriptive data includes original values $x_{i,j}$ for a plurality of descriptive attributes j associated with a telecommunication call graph formed by a plurality of edges i between a plurality of nodes. Each edge i relates to two nodes of the plurality of nodes. Each original value $x_{i,j}$ relates to a unique edge i in the telecommunication call graph and a unique descriptive attribute j for the corresponding edge i. The unique edge i and unique descriptive attribute j forming an edge-attribute pair i,j relating to the corresponding original value $x_{i,j}$. The local storage device 1504 configured to at least temporarily store the plurality of descriptive data.

The scaling/weighting processor 1506 configured to determine scaling factors for each descriptive attribute j in a manner that takes into account a distribution of the original values $x_{i,j}$ for the corresponding descriptive attribute j and a common base for the plurality of descriptive attributes j and configured to determine weighting factors for each descriptive attribute j. The composite tie metric processor 1508 configured to compute a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$. The plurality of descriptive attributes j include the first attribute $j_1$ and the second attribute $j_2$.

In another embodiment of the computing device 1500, the scaling/weighting processor 1506 is configured to determine the scaling factor for each descriptive attribute j based at least in part on determining a representative maximum value $|x_j|$ for the corresponding descriptive attribute j to establish a unit base for each descriptive attribute j as the common base. In a further embodiment, the scaling/weighting processor 1506 is configured to divide the first original value $x_{i_1,j_1}$ by the representative maximum value $|x_{j_1}|$ for the first attribute $j_1$ to form a first scaled value $\acute{x}_{i_1,j_1}$ for a corresponding first edge-attribute pair $i_1,j_1$ and configured to divide the second original value $x_{i_1,j_2}$ by the representative maximum value $|x_{j_2}|$ for the second attribute $j_2$ to form a second scaled value $\acute{x}_{i_1,j_2}$ for a corresponding second edge-attribute pair $i_1,j_2$. In this embodiment, the composite tie metric processor 1508 is configured to multiply the first weighting factor $\propto_{i_1,j_1}$ for the first edge-attribute pair $i_1,j_1$ by the first scaled value $\acute{x}_{i_1,j_1}$ to form a first tie attribute component $\propto_1 \acute{x}_1$, configured to multiply the second weighting factor $\propto_{i_1,j_2}$ for the second edge-attribute pair $i_1,j_2$ by the second scaled value $\acute{x}_{i_1,j_2}$ to form a second tie attribute component $\propto_2 \acute{x}_2$, configured to sum the first tie attribute component $\propto_1 \acute{x}_1$ and the second tie attribute component $\propto_2 \acute{x}_2$ to obtain a raw composite tie metric $S_{i_1}$ for the first edge $i_1$, and configured to derive a normalized composite tie metric $F(S_{i_1})$ for the first edge $i_1$ based at least in part on an exponential function of the raw composite tie metric $S_{i_1}$. It is understood that the computing device 1500 for deriving the composite tie metric described herein can be used for any number of attributes beyond the exemplary first and second attributes.

In yet another embodiment of the computing device 1500, the scaling/weighting processor 1506 is configured to calculate a representative mean value $\bar{x}_j$ for each descriptive attribute j, configured to calculate a standard deviation $\sigma_j$ for each descriptive attribute j, configured to determine a difference between each original value $x_{i,j}$ and the representative mean value $\bar{x}_j$ for each descriptive attribute j to form a corresponding set of intermediate values $\acute{x}_{i,j}$ for each descriptive attribute j, configured to divide each intermediate value $\acute{x}_{i,j}$ for each descriptive attribute j by the standard deviation $\sigma_j$ for the corresponding descriptive attribute j to form a corresponding set of scaled values $\acute{x}_{i,j}$ for each descriptive attribute j with the common base represented by zero mean and unity variance, and configured to form a covariance matrix $\Sigma$ from the scaled values $\acute{x}_{i,j}$ for the plurality of descriptive attributes j. In a further embodiment, the scaling/weighting processor 1506 is configured to find the first scaling factor $U_{j_1}$ for the first attribute $j_1$ from the covariance matrix $\Sigma$ in relation to the first edge $i_1$ and associated with a first edge-attribute pair $i_1, j_1$, configured to find the second scaling factor $U_{j_2}$ for the second attribute $j_2$ from the covariance matrix $\Sigma$ in relation to the first edge $i_1$ and associated with a second edge-attribute pair $i_1, j_2$, configured to find the first weighting factor $\Lambda_{j_1}$ for the first attribute $j_1$ from the covariance matrix $\Sigma$ in relation to the first edge $i_1$ and associated with the first edge-attribute pair $i_1, j_1$, and configured to find the second weighting factor $\Lambda_{j_2}$ for the second attribute $j_2$ from the covariance matrix $\Sigma$ in relation to the first edge $i_1$ and associated with the second edge-attribute pair $i_1, j_2$. In this embodiment, the composite tie metric processor 1508 is configured to multiply the original value $x_{i_1, j_1}$ for the first edge-attribute pair $i_1, j_1$ by the first scaling factor $U_{j_1}$ and the first weighting factor $\Lambda_{j_1}$ to form a first tie attribute component $S_{j_1}$ for the first edge $i_1$, configured to multiply the original value $x_{i_1, j_2}$ for the second edge-attribute pair $i_1, j_2$ by the second scaling factor $U_{j_2}$ and the second weighting factor $\Lambda_{j_2}$ to form a second tie attribute component $S_{j_2}$ the first edge $i_1$, and configured to sum the first tie attribute component $S_{j_1}$ and the second tie attribute component $S_{j_2}$ to obtain a normalized composite tie metric $S_{i_1}$ for the first edge $i_1$. It is understood that the computing device 1500 for deriving the composite tie metric described herein can be used for any number of attributes beyond the exemplary first and second attributes.

In yet another embodiment of the computing device 1500, the scaling/weighting processor 1506 is configured to determine the scaling factors such that a corresponding set of scaled values $\acute{x}_{i,j}$ are formed from the original values $x_{i,j}$ for each descriptive attribute j such that the common base for the scaled values $\acute{x}_{i,j}$ for each descriptive attribute j reflects zero mean and unity variance. In a further embodiment, the scaling/weighting processor 1506 is configured to form a covariance matrix $\Sigma$ from the scaled values $\acute{x}_{i,j}$ for the plurality of descriptive attributes j and configured to find a set of eigenvectors for the covariance matrix $\Sigma$ and a corresponding set of eigenvalues. In an even further embodiment, the composite tie metric processor 1508 is configured to process the original values $x_{i,j}$ for the descriptive attributes j of the first edge $i_1$ in an alternate space using the eigenvectors from the covariance matrix $\Sigma$ to form a corresponding plurality of projected vectors for the first edge $i_1$, configured to multiply each projected vector from the plurality of projected vectors for the first edge $i_1$ by the corresponding eigenvalue from the covariance matrix to form a plurality of tie attribute components $S_{i_1, j_1 \ldots n}$ for the first edge $i_1$, and configured to sum the plurality of tie attribute components $S_{i_1, j_1 \ldots n}$ to obtain a normalized composite tie metric $S_{i_1}$ for the first edge $i_1$.

Figure 13:
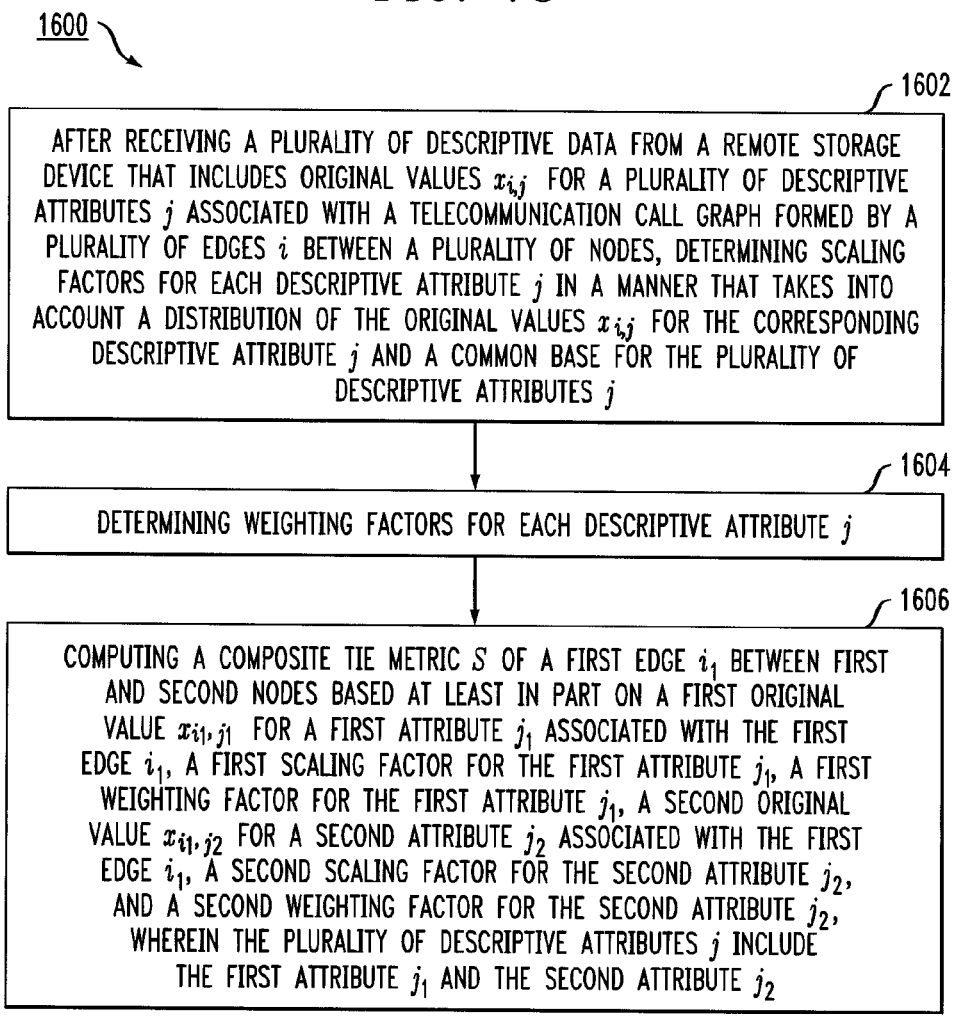
FIG. 13 is a flow chart of an exemplary embodiment of a process for deriving a composite tie metric for an edge between nodes of a telecommunication call graph performed by a computing device with a processor executing program instructions stored in a non-transitory computer-readable medium.

With reference to FIG. 13, an exemplary embodiment of a non-transitory computer-readable medium storing program instructions that, when executed by a processor, cause a computing device to perform a process 1600 for deriving a composite tie metric for an edge between nodes of a telecommunication call graph. In one exemplary embodiment, the process 1600 includes, after receiving a plurality of descriptive data from a remote storage device that includes original values $x_{i,j}$ for a plurality of descriptive attributes j associated with a telecommunication call graph formed by a plurality of edges i between a plurality of nodes, determining scaling factors for each descriptive attribute j in a manner that takes into account a distribution of the original values $x_{i,j}$ for the corresponding descriptive attribute j and a common base for the plurality of descriptive attributes j (1602). Each edge i relates to two nodes of the plurality of nodes. Each original value $x_{i,j}$ relates to a unique edge i in the telecommunication call graph and a unique descriptive attribute j for the corresponding edge i, the unique edge I and unique descriptive attribute j forming an edge-attribute pair i,j relating to the corresponding original value $x_{i,j}$. At 1604, weighting factors are determined for each descriptive attribute j. A composite tie metric S of a first edge $i_1$ between first and second nodes is computed based at least in part on a first original value $x_{i_1, j_1}$ for a first attribute $j_1$ associated with the first edge $i_1$, a first scaling factor for the first attribute $j_1$, a first weighting factor for the first attribute $j_1$, a second original value $x_{i_1, j_2}$ for a second attribute $j_2$ associated with the first edge $i_1$, a second scaling factor for the second attribute $j_2$, and a second weighting factor for the second attribute $j_2$. The plurality of descriptive attributes j include the first attribute $j_1$ and the second attribute $j_2$.

In various additional embodiments, the instructions stored in the non-transitory computer-readable memory, when executed by the processor, may cause the computing device to perform various combinations of functions associated with the processes 900, 1000, 1100, 1200, 1300, 1400 for deriving a composite tie metric for an edge between nodes of a telecommunication call graph. In other words, the various features described above may be implemented in any suitable combination by the program instructions stored in the non-transitory computer-readable medium. Any suitable components of the computing device 1500 described above may include the corresponding processor and non-transitory computer-readable medium associated with the corresponding program instructions. Alternatively, the corresponding processor and non-transitory computer-readable medium associated with the corresponding program instructions may be individual or combined components that are in operative communication with any suitable combination of components of the computing device 1500 described above.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for deriving a composite tie metric for an edge between nodes of a telecommunication call graph, comprising:

receiving a plurality of descriptive data at a computing device from a remote storage device, wherein the plurality of descriptive data includes original values $x_{i,j}$ for a plurality of descriptive attributes j associated with a telecommunication call graph formed by a plurality of edges i between a plurality of nodes, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$;

at least temporarily storing the plurality of descriptive data in a local storage device;

determining scaling factors for each descriptive attribute j at the computing device in a manner that takes into account a distribution of the original values $x_{i,j}$ for the corresponding descriptive attribute j and a common base for the plurality of descriptive attributes j;

determining weighting factors for each descriptive attribute j at the computing device; and computing a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$ at the computing device, wherein the plurality of descriptive attributes j include the first attribute $j_1$ and the second attribute $j_2$;

wherein the determined scaling factor for each descriptive attribute j is based at least in part on determining a representative maximum value $|x_j|$ for the corresponding descriptive attribute j to establish a unit base for each descriptive attribute j as the common base;

wherein the representative maximum value $|x_j|$ for each descriptive attribute j is based at least in part on the expression:

$$|x_j| = \sqrt{\sum_{i=1}^{n} x_{i,j}^2}$$

where n defines a number of edges included in the plurality of edges.

2. The method of claim 1 wherein the plurality of edges i and the plurality of nodes form a telecommunication network and the descriptive data is associated with communication sessions utilizing resources of the telecommunication network during a predetermined time, wherein each edge i represents a connection through which at least one communication session was connected during the predetermined time period.

3. The method of claim 2 wherein the plurality of descriptive attributes j associated with the plurality of edges j comprise at least one of an amount of communication sessions over the corresponding edge j, an accumulated duration measure for communication sessions over the corresponding edge j, an amount of common neighbors for the nodes associated with the corresponding edge j, and one or more demographic parameters for the nodes associated with the corresponding edge j.

4. The method of claim 1 wherein the plurality of edges comprise directed edges reflecting whether each edge is outgoing or incoming in relation to the nodes with which the corresponding edge is associated.

5. The method of claim 1, further comprising:

dividing the first original value by the representative maximum value $|x_{j_1}|$ for the first attribute $j_1$ at the computing device to form a first scaled value $\acute{x}_{i_1,j_1}$ for a corresponding first edge-attribute pair $i_1,j_1$;

dividing the second original value $x_{i_1,j_2}$ by the representative maximum value $|x_{j_2}|$ for the second attribute $j_2$ at the computing device to form a second scaled value $\acute{x}_{i_1,j_1}$ for a corresponding second edge-attribute pair $i_1,j_2$;

multiplying the first weighting factor $\propto_{i_1,j_1}$ for the first edge-attribute pair $i_1,j_1$ by the first scaled value $\acute{x}_{i_1,j_1}$ at the computing device to form a first tie attribute component $\propto_1 \acute{x}_1$;

multiplying the second weighting factor $\propto_{i_1,j_2}$ for the second edge-attribute pair $i_1,j_2$ by the second scaled value $\acute{x}_{i_1,j_2}$ at the computing device to form a second tie attribute component $\propto_2 \acute{x}_2$;

summing the first tie attribute component $\propto_1 \acute{x}_1$ and the second tie attribute component $\propto_2 \acute{x}_2$ at the computing device to obtain a raw composite tie metric $S_{i_1}$ for the first edge $i_1$; and deriving a normalized composite tie metric $F(S_{i_1})$ for the first edge $i_1$ at the computing device based at least in part on an exponential function of the raw composite tie metric $S_{i_1}$.

6. The method of claim 5 wherein the first scaled value $\acute{x}_{i_1,j_1}$ is based at least in part on the expression:

$$\acute{x}_{i_1,j_1} = \frac{x_{i_1,j_1}}{|x_{j_1}|}$$

and the second scaled value $\acute{x}_{i_1,j_2}$ is based at least in part on the same expression for $x_{i_1,i_2}$ and $|x_{j_2}|$.

7. The method of claim 5 wherein the raw composite tie metric $S_{i_1}$ for the first edge $i_1$ is based at least in part on the expression:

$$S_i = \propto_1 \acute{x}_1 + \propto_2 \acute{x}_2.$$

8. The method of claim 5 wherein the normalized composite tie metric $F(S_{i_1})$ for the first edge $i_1$ is based at least in part on the expression:

$$F(S_i) = 1 - \exp\left(-\frac{S_i}{\varepsilon^2}\right)$$

where $\varepsilon$ is a constant that controls saturation of the normalized composite tie metric $F(S_i)$ in conjunction with the raw composite tie metric $S_i$.

9. The method of claim 1, in conjunction with determining the scaling and weighting factors, the method further comprising:

calculating a representative mean value $\overline{x}_j$ for each descriptive attribute j at the computing device;

calculating a standard deviation $\sigma_j$ for each descriptive attribute j at the computing device;

determining a difference between each original value $x_{i,j}$ and the representative mean value $\overline{x}_j$ for each descriptive attribute j at the computing device to form a corresponding set of intermediate values $\acute{x}_{i,j}$ for each descriptive attribute j;

dividing each intermediate value $\acute{x}_{i,j}$ for each descriptive attribute j by the standard deviation $\sigma_j$ for the corresponding descriptive attribute j at the computing device to form a corresponding set of scaled values for each descriptive attribute j with the common base represented by zero mean and unity variance; and forming a covariance matrix $\Sigma$ from the scaled values $\acute{x}_{i,j}$ for the plurality of descriptive attributes j at the computing device.

10. The method of claim 9, further comprising:

finding the first scaling factor $U_{j_1}$ for the first attribute $j_1$ from the covariance matrix $\Sigma$ in relation to the first edge $i_1$ and associated with a first edge-attribute pair $i_1,j_1$;

finding the second scaling factor $U_{j_2}$ for the second attribute $j_2$ from the covariance matrix $\Sigma$ in relation to the first edge $i_1$ and associated with a second edge-attribute pair $i_1,j_2$;

finding the first weighting factor $\Lambda_{j_1}$ for the first attribute $j_1$ from the covariance matrix $\Sigma$ in relation to the first edge $i_1$ and associated with the first edge-attribute pair finding the second weighting factor $\Lambda_{j_2}$ for the second attribute $j_2$ from the covariance matrix $\Sigma$ in relation to the first edge $i_1$ and associated with the second edge-attribute pair $i_1,j_2$;

multiplying the original value $x_{i_1,j_1}$ for the first edge-attribute pair $i_1,j_1$ by the first scaling factor $U_{j_1}$ and the first weighting factor $\Lambda_{j_1}$ to form a first tie attribute component $S_{j_1}$ for the first edge $i_1$;

multiplying the original value $x_{i_1,j_2}$ for the second edge-attribute pair $i_1,j_2$ by the second scaling factor $U_{j_2}$ and the second weighting factor $\Lambda_{j_2}$ to form a second tie attribute component $S_{j_2}$ for the first edge $i_1$; and summing the first tie attribute component $S_{j_1}$ and the second tie attribute component $S_{j_2}$ to obtain a normalized composite tie metric $S_{i_1}$ for the first edge $i_1$.

11. The method of claim 10 wherein the first tie attribute component $S_{j_1}$ and the second tie attribute component $S_{j_2}$ for the first edge $i_1$ are based at least in part on the expression:

$$S_{j_n} = x_{i_1,j_n} * U_{j_n} * \partial_{j_n},$$

where n identifies the corresponding descriptive attribute j.

12. The method of claim 1 wherein the scaling factors are determined such that a corresponding set of scaled values $\acute{x}_{i,j}$ are formed from the original values $x_{i,j}$ for each descriptive attribute j such that the common base for the scaled values $\acute{x}_{i,j}$ for each descriptive attribute j reflects zero mean and unity variance.

13. The method of claim 12, further comprising:

forming a covariance matrix $\Sigma$ from the scaled values $\acute{x}_{i,j}$ for the plurality of descriptive attributes j; and finding a set of eigenvectors for the covariance matrix $\Sigma$ and a corresponding set of eigenvalues.

14. The method of claim 13, further comprising:

processing the original values $x_{i,j}$ for the descriptive attributes j of the first edge $i_1$ in an alternate space using the eigenvectors from the covariance matrix $\Sigma$ to form a corresponding plurality of projected vectors for the first edge $i_1$;

multiplying each projected vector from the plurality of projected vectors for the first edge $i_1$ by the corresponding eigenvalue from the covariance matrix to form a plurality of tie attribute components $S_{i_1,j_1 \ldots n}$ for the first edge $i_1$; and summing the plurality of tie attribute components $S_{i_1,j_1 \ldots n}$ to obtain a normalized composite tie metric $S_{i_1}$ for the first edge $i_1$.

15. An apparatus for deriving a composite tie metric for an edge between nodes of a telecommunication call graph, comprising:

a data communication module configured to receive a plurality of descriptive data from a remote storage device, wherein the plurality of descriptive data includes original values $x_{i,j}$ for a plurality of descriptive attributes j associated with a telecommunication call graph formed by a plurality of edges i between a plurality of nodes, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$;

a local storage device configured to at least temporarily store the plurality of descriptive data;

a scaling/weighting processor configured to determine scaling factors for each descriptive attribute j in a manner that takes into account a distribution of the original values $x_{i,j}$ for the corresponding descriptive attribute j and a common base for the plurality of descriptive attributes j and configured to determine weighting factors for each descriptive attribute j; and a composite tie metric processor configured to compute a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$, wherein the plurality of descriptive attributes j include the first attribute $j_1$ and the second attribute $j_2$;

wherein the scaling/weighting processor is configured to determine the scaling factor for each descriptive attribute j based at least in part on determining a representative maximum value $|x_j|$ for the corresponding descriptive attribute j to establish a unit base for each descriptive attribute j as the common base;

wherein the representative maximum value $|x_j|$ for each descriptive attribute j is based at least in part on the expression:

$$|x_j| = \sqrt{\sum_{i=1}^{n} x_{i,j}^2}$$

where n defines a number of edges included in the plurality of edges.

16. The apparatus of claim 15 wherein:

the scaling/weighting processor is configured to divide the first original value $x_{i_1,j_1}$ by the representative maximum value $|x_{j_1}|$ for the first attribute $j_1$ to form a first scaled value $\acute{x}_{i_1,j_1}$ for a corresponding first edge-attribute pair $i_1,j_1$ and configured to divide the second original value $x_{i_1,j_2}$ by the representative maximum value $|x_{j_2}|$ for the second attribute $j_2$ to form a second scaled value for a corresponding second edge-attribute pair $i_1,j_2$; and the composite tie metric processor is configured to multiply the first weighting factor $\alpha_{i_1,j_1}$ for the first edge-attribute pair $i_1,j_1$ by the first scaled value $\acute{x}_{i_1,j_1}$ to form a first tie attribute component $\alpha_1 \acute{x}_1$, configured to multiply the second weighting factor $\alpha_{i_1,j_2}$ for the second edge-attribute pair $i_1,j_2$ by the second scaled value $\acute{x}_{i_1,j_1}$ to form a second tie attribute component $\alpha_2 \acute{x}_2$, configured to sum the first tie attribute component $\alpha_1 \acute{x}_1$ and the second tie attribute component $\alpha_2 \acute{x}_2$ to obtain a raw composite tie metric $S_{i_1}$ for the first edge $i_1$, and configured to derive a normalized composite tie metric $F(S_{i_1})$ for the first edge $i_1$ based at least in part on an exponential function of the raw composite tie metric $S_{i_1}$.

17. The apparatus of claim 15 wherein the scaling/weighting processor is configured to calculate a representative mean value for each descriptive attribute j, configured to calculate a standard deviation $\bar{x}_j$ for each descriptive attribute j, configured to determine a difference between each original value $x_{i,j}$ and the representative mean value $\bar{x}_j$ for each descriptive attribute j to form a corresponding set of intermediate values $\acute{x}_{i,j}$ for each descriptive attribute j, configured to divide each intermediate value $\acute{x}_{i,j}$ for each descriptive attribute j by the standard deviation $\sigma_j$ for the corresponding descriptive attribute j to form a corresponding set of scaled values $\acute{x}_{i,j}$ for each descriptive attribute j with the common base represented by zero mean and unity variance, and configured to form a covariance matrix $\Sigma$ from the scaled values $\acute{x}_{i,j}$ for the plurality of descriptive attributes j.

18. The apparatus of claim 17 wherein:
the scaling/weighting processor is configured to find the first scaling factor $U_{j_1}$ for the first attribute $j_1$ from the covariance matrix $\Sigma$ in relation to the first edge $i_1$ and associated with a first edge-attribute pair $i_1,j_1$, configured to find the second scaling factor $U_{j_2}$ for the second attribute $j_2$ from the covariance matrix $\Sigma$ in relation to the first edge $i_1$ and associated with a second edge-attribute pair $i_1,j_2$, configured to find the first weighting factor $\Lambda_{j_1}$ for the first attribute $j_1$ from the covariance matrix $\Sigma$ in relation to the first edge $i_1$ and associated with the first edge-attribute pair $i_1,j_1$, and configured to find the second weighting factor $\Lambda_{j_2}$ for the second attribute $j_2$ from the covariance matrix $\Sigma$ in relation to the first edge $i_1$ and associated with the second edge-attribute pair $i_1,j_2$; and
the composite tie metric processor is configured to multiply the original value $x_{i_1,j_1}$ for the first edge-attribute pair $i_1,j_1$ by the first scaling factor $U_{j_1}$ and the first weighting factor $\Lambda_{j_1}$ to form a first tie attribute component $S_{j_1}$ for the first edge configured to multiply the original value $x_{i_1,j_2}$ for the second edge-attribute pair $i_1,j_2$ by the second scaling factor $U_{j_2}$ and the second weighting factor $\Lambda_{j_2}$ to form a second tie attribute component $S_{j_2}$ for the first edge $i_1$, and configured to sum the first tie attribute component $S_{j_1}$ and the second tie attribute component $S_{j_2}$ to obtain a normalized composite tie metric $S_{i_1}$ for the first edge $i_1$.

19. The apparatus of claim 15 wherein the scaling/weighting processor is configured to determine the scaling factors such that a corresponding set of scaled values $\acute{x}_{i,j}$ are formed from the original values $x_{i,j}$ for each descriptive attribute j such that the common base for the scaled values $\acute{x}_{i,j}$ for each descriptive attribute j reflects zero mean and unity variance.

20. The apparatus of claim 19 wherein the scaling/weighting processor is configured to form a covariance matrix $\Sigma$ from the scaled values $\acute{x}_{i,j}$ for the plurality of descriptive attributes j and configured to find a set of eigenvectors for the covariance matrix $\Sigma$ and a corresponding set of eigenvalues.

21. The apparatus of claim 20 wherein the composite tie metric processor is configured to process the original values $x_{i,j}$ for the descriptive attributes j of the first edge $i_1$ in an alternate space using the eigenvectors from the covariance matrix $\Sigma$ to form a corresponding plurality of projected vectors for the first edge $i_1$, configured to multiply each projected vector from the plurality of projected vectors for the first edge by the corresponding eigenvalue from the covariance matrix to form a plurality of tie attribute components $S_{i_1,j_1 \ldots n}$ for the first edge $i_1$, and configured to sum the plurality of tie attribute components $S_{i_1,j_1 \ldots n}$ to obtain a normalized composite tie metric $S_{i_1}$ for the first edge $i_1$.

22. A non-transitory computer-readable medium storing program instructions that, when executed by a processor, cause a computing device to perform a method for deriving a composite tie metric for an edge between nodes of a telecommunication call graph, the method comprising:
after receiving a plurality of descriptive data from a remote storage device that includes original values $x_{i,j}$ for a plurality of descriptive attributes j associated with a telecommunication call graph formed by a plurality of edges i between a plurality of nodes, determining scaling factors for each descriptive attribute j in a manner that takes into account a distribution of the original values $x_{i,j}$ for the corresponding descriptive attribute j and a common base for the plurality of descriptive attributes j, wherein each edge i relates to two nodes of the plurality of nodes, wherein each original value $x_{i,j}$ relates to a unique edge i in the telecommunication call graph and a unique descriptive attribute j for the corresponding edge i, the unique edge i and unique descriptive attribute j forming an edge-attribute pair i,j relating to the corresponding original value $x_{i,j}$;
determining weighting factors for each descriptive attribute j; and
computing a composite tie metric S of a first edge $i_1$ between first and second nodes based at least in part on a first original value $x_{i_1,j_1}$ for a first attribute $j_1$ associated with the first edge $i_1$, a first scaling factor for the first attribute $j_1$, a first weighting factor for the first attribute $j_1$, a second original value $x_{i_1,j_2}$ for a second attribute $j_2$ associated with the first edge $i_1$, a second scaling factor for the second attribute $j_2$, and a second weighting factor for the second attribute $j_2$, wherein the plurality of descriptive attributes j include the first attribute $j_1$ and the second attribute $j_2$;
wherein the determined scaling factor for each descriptive attribute j is based at least in part on determining a representative maximum value $|x_j|$ for the corresponding descriptive attribute j to establish a unit base for each descriptive attribute j as the common base;
wherein the representative maximum value $|x_j|$ for each descriptive attribute j is based at least in part on the expression:

$$|x_j| = \sqrt{\sum_{i=1}^{n} x_{i,j}^2}$$

where n defines a number of edges included in the plurality of edges.

23. The apparatus of claim 15 wherein the plurality of edges i and the plurality of nodes form a telecommunication network and the descriptive data is associated with communication sessions utilizing resources of the telecommunication network during a predetermined time, wherein each edge i represents a connection through which at least one communication session was connected during the predetermined time period.

24. The non-transitory computer-readable medium of claim 22, in conjunction with determining the scaling and weighting factors, the method further comprising:
calculating a representative mean value $\bar{x}_j$ for each descriptive attribute j;

calculating a standard deviation $\sigma_j$ for each descriptive attribute j;

determining a difference between each original value $x_{i,j}$ and the representative mean value $\bar{x}_j$ for each descriptive attribute j to form a corresponding set of intermediate values $\dot{x}_{i,j}$ for each descriptive attribute j;

dividing each intermediate value $\dot{x}_{i,j}$ for each descriptive attribute j by the standard deviation $\sigma_j$ for the corresponding descriptive attribute j to form a corresponding set of scaled values $\acute{x}_{i,j}$ for each descriptive attribute j with the common base represented by zero mean and unity variance; and forming a covariance matrix $\Sigma$ from the scaled values $\acute{x}_{i,j}$ for the plurality of descriptive attributes j.

25. The non-transitory computer-readable medium of claim 22 wherein the scaling factors are determined such that a corresponding set of scaled values are formed from the original values $x_{i,j}$ for each descriptive attribute j such that the common base for the scaled values $\acute{x}_{i,j}$ for each descriptive attribute j reflects zero mean and unity variance.

* * * * *